(12) United States Patent
Canberk et al.

(10) Patent No.: US 12,086,324 B2
(45) Date of Patent: Sep. 10, 2024

(54) MICRO HAND GESTURES FOR CONTROLLING VIRTUAL AND GRAPHICAL ELEMENTS

(71) Applicant: Snap Inc., Santa Monica, CA (US)

(72) Inventors: Ilteris Canberk, Marina Del Rey, CA (US); Viktoria Hwang, Los Angeles, CA (US); Shin Hwun Kang, Los Angeles, CA (US); David Meisenholder, Los Angeles, CA (US); Daniel Moreno, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/550,679

(22) Filed: Dec. 14, 2021

(65) Prior Publication Data

US 2022/0206588 A1 Jun. 30, 2022

Related U.S. Application Data

(60) Provisional application No. 63/131,403, filed on Dec. 29, 2020.

(51) Int. Cl.
*G06F 3/04815* (2022.01)
*G02B 27/01* (2006.01)
(Continued)

(52) U.S. Cl.
CPC ......... *G06F 3/017* (2013.01); *G02B 27/0101* (2013.01); *G02B 27/017* (2013.01);
(Continued)

(58) Field of Classification Search
CPC ...... G06F 3/017; G06F 3/011; G06F 3/04883; G06F 3/0304; G06F 1/163; G06F 3/016;
(Continued)

(56) References Cited

U.S. PATENT DOCUMENTS 6,323,846 B1 11/2001 Westerman et al.
8,799,821 B1 8/2014 Rose et al.
(Continued)

FOREIGN PATENT DOCUMENTS

CN 106199511 A 12/2016
EP 3116615 A1 1/2017
(Continued)

OTHER PUBLICATIONS

Google Atap, Welcome to Project Soli, May 29, 2015 (Year: 2015).*
(Continued)

*Primary Examiner* — Rayeez R Chowdhury
(74) *Attorney, Agent, or Firm* — Culhane PLLC; Stephen J. Weed

(57) ABSTRACT

Example systems, devices, media, and methods are described for controlling virtual elements or graphical elements on a display in response to hand gestures detected by an eyewear device that is capturing frames of video data with its camera system. An image processing system detects a series of hand shapes in the video data and determines whether it matches a predefined series of hand gestures. Each predefined series of hand gestures is associated with an action. The system controls movement of the virtual element, relative to the display, in accordance with the associated action. In an example hand shape that includes a thumb sliding along an extended finger, the system establishes a finger scale along the extended finger, calibrates a graphical scale with the finger scale, and controls movement of an interactive graphical element, such as a slider, according to the current thumb position relative to the calibrated graphical scale.

17 Claims, 16 Drawing Sheets

(51) Int. Cl.
  *G06F 3/01* (2006.01)
  *G06F 3/04847* (2022.01)
  *G06T 19/00* (2011.01)
  *G06V 20/40* (2022.01)
  *G06V 40/10* (2022.01)
  *G06V 40/20* (2022.01)

(52) U.S. Cl.
  CPC ...... *G06F 3/04815* (2013.01); *G06F 3/04847* (2013.01); *G06T 19/006* (2013.01); *G06V 20/46* (2022.01); *G06V 40/113* (2022.01); *G06V 40/28* (2022.01); *G02B 2027/0138* (2013.01); *G02B 2027/0178* (2013.01)

(58) Field of Classification Search
  CPC ............... G06F 3/04847; G06F 3/0488; G06F 3/04815; G06F 3/0484; G06F 3/04845; G06F 21/31; G06F 21/36; G06F 3/0481; G06F 3/04842; G06F 3/04886; G06F 1/1626; G06F 1/1671; G06F 1/169; G06F 2200/1614; G06F 2203/04806; G06F 3/014; G06F 3/0346; G06F 3/042; G06F 3/0485; G06F 3/04855; G06F 3/04897; G06F 3/1431; G06F 21/316; G06F 2203/04802; G06F 3/005; G06F 3/012; G06F 3/0482; G06F 1/1686; G06F 3/0233; G06F 3/167; G06F 16/24568; G06F 16/24578; G06F 16/285; G06F 2203/0381; G06F 21/604; G06F 3/0425; G06F 3/01; G06F 3/013; G06F 3/048; G06F 3/04817; G06F 8/34; G06F 8/38; G06F 9/451; G06F 16/951; G06F 16/953; G06F 2203/04102; G06F 3/0426
  See application file for complete search history.

(56) References Cited

U.S. PATENT DOCUMENTS

| | | | |
|---|---|---|---|
| 9,024,842 B1 | 5/2015 | Gomez et al. | |
| 9,098,739 B2 | 8/2015 | Mutto et al. | |
| 9,207,771 B2 | 12/2015 | Antoniac | |
| 9,235,051 B2 | 1/2016 | Salter et al. | |
| 9,459,454 B1 | 10/2016 | The et al. | |
| 9,541,996 B1 | 1/2017 | Baxter et al. | |
| 9,552,673 B2 | 1/2017 | Hilliges et al. | |
| 9,671,566 B2 | 6/2017 | Abovitz et al. | |
| 9,990,029 B2 | 6/2018 | Kochi | |
| 9,996,983 B2 | 6/2018 | Mullins | |
| 10,057,400 B1 * | 8/2018 | Gordon | H04M 1/673 |
| 10,146,414 B2 | 12/2018 | Heater | |
| 10,220,303 B1 | 3/2019 | Schmidt et al. | |
| 10,288,419 B2 | 5/2019 | Abovitz et al. | |
| 10,372,228 B2 * | 8/2019 | Mao | G06T 7/285 |
| 10,394,334 B2 | 8/2019 | Wang | |
| 10,429,923 B1 | 10/2019 | Johnston et al. | |
| 10,509,461 B2 | 12/2019 | Mullen | |
| 10,579,207 B2 | 3/2020 | Piya et al. | |
| 10,642,369 B2 | 5/2020 | Iyer et al. | |
| 10,782,779 B1 | 9/2020 | Eubank et al. | |
| 10,852,838 B2 | 12/2020 | Bradski et al. | |
| 10,853,991 B1 | 12/2020 | Yan et al. | |
| 10,866,093 B2 | 12/2020 | Abovitz et al. | |
| 10,902,250 B2 | 1/2021 | Konin et al. | |
| 10,909,762 B2 | 2/2021 | Karalis et al. | |
| 10,928,975 B2 | 2/2021 | Wang et al. | |
| 10,936,080 B2 | 3/2021 | Marcolina et al. | |
| 11,003,307 B1 | 5/2021 | Ravasz et al. | |
| 11,086,126 B1 | 8/2021 | Gollier et al. | |
| 11,275,453 B1 | 3/2022 | Tham et al. | |
| 11,277,597 B1 | 3/2022 | Canberk et al. | |
| 11,294,472 B2 | 4/2022 | Tang et al. | |
| 11,320,911 B2 | 5/2022 | Schwarz et al. | |
| 11,334,179 B2 | 5/2022 | Li et al. | |
| 11,380,021 B2 | 7/2022 | Nakata | |
| 11,481,025 B2 | 10/2022 | Shimizu et al. | |
| 11,494,000 B2 | 11/2022 | Katz et al. | |
| 11,500,512 B2 | 11/2022 | Reithmeir et al. | |
| 11,520,399 B2 | 12/2022 | Kang et al. | |
| 11,531,402 B1 | 12/2022 | Stolzenberg | |
| 11,546,505 B2 | 1/2023 | Canberk | |
| 11,631,228 B2 | 4/2023 | Fieldman | |
| 2005/0271279 A1 | 12/2005 | Fujimura et al. | |
| 2007/0220108 A1 | 9/2007 | Whitaker | |
| 2008/0219502 A1 | 9/2008 | Shamaie | |
| 2009/0119609 A1 | 5/2009 | Matsumoto | |
| 2010/0085317 A1 * | 4/2010 | Park | G06F 3/04817 |
| | | | 715/810 |
| 2011/0213664 A1 | 9/2011 | Osterhout et al. | |
| 2012/0027252 A1 | 2/2012 | Liu et al. | |
| 2012/0027263 A1 | 2/2012 | Liu et al. | |
| 2012/0056730 A1 | 3/2012 | Ujiie et al. | |
| 2012/0086729 A1 | 4/2012 | Baseley et al. | |
| 2012/0113223 A1 | 5/2012 | Hilliges et al. | |
| 2012/0194644 A1 | 8/2012 | Newcombe et al. | |
| 2012/0327117 A1 | 12/2012 | Weller et al. | |
| 2013/0145320 A1 | 6/2013 | Oosterholt et al. | |
| 2013/0328927 A1 | 12/2013 | Mount et al. | |
| 2013/0335324 A1 | 12/2013 | Kaplan et al. | |
| 2014/0043211 A1 | 2/2014 | Park | |
| 2014/0212000 A1 | 7/2014 | Yagcioglu et al. | |
| 2014/0225918 A1 * | 8/2014 | Mittal | G06T 19/006 |
| | | | 345/633 |
| 2014/0306993 A1 | 10/2014 | Poulos et al. | |
| 2014/0347289 A1 * | 11/2014 | Suh | G06F 3/04847 |
| | | | 345/3.1 |
| 2014/0361988 A1 | 12/2014 | Katz et al. | |
| 2014/0368533 A1 * | 12/2014 | Salter | G06F 3/04815 |
| | | | 345/619 |
| 2015/0049017 A1 * | 2/2015 | Weber | G06F 21/36 |
| | | | 345/156 |
| 2015/0073753 A1 | 3/2015 | Rameau | |
| 2015/0091824 A1 | 4/2015 | Hori | |
| 2015/0097719 A1 | 4/2015 | Balachandreswaran et al. | |
| 2015/0109197 A1 | 4/2015 | Takagi | |
| 2015/0169176 A1 | 6/2015 | Cohen et al. | |
| 2015/0199780 A1 | 7/2015 | Beyk | |
| 2015/0269783 A1 | 9/2015 | Yun | |
| 2015/0317833 A1 | 11/2015 | Ebstyne et al. | |
| 2015/0331576 A1 * | 11/2015 | Piya | G06F 3/04815 |
| | | | 715/850 |
| 2015/0370321 A1 | 12/2015 | Lundberg | |
| 2016/0033770 A1 | 2/2016 | Fujimaki et al. | |
| 2016/0035134 A1 | 2/2016 | Tanaka et al. | |
| 2016/0098093 A1 | 4/2016 | Cheon et al. | |
| 2016/0260251 A1 | 9/2016 | Stafford et al. | |
| 2016/0261834 A1 | 9/2016 | Li et al. | |
| 2016/0306431 A1 | 10/2016 | Stafford et al. | |
| 2017/0003746 A1 | 1/2017 | Anglin et al. | |
| 2017/0014683 A1 | 1/2017 | Maruyama et al. | |
| 2017/0028299 A1 | 2/2017 | The et al. | |
| 2017/0053447 A1 | 2/2017 | Chen et al. | |
| 2017/0097687 A1 | 4/2017 | Pinault et al. | |
| 2017/0123487 A1 | 5/2017 | Hazra et al. | |
| 2017/0124713 A1 | 5/2017 | Jurgenson et al. | |
| 2017/0140552 A1 * | 5/2017 | Woo | G06F 3/0304 |
| 2017/0235272 A1 | 8/2017 | Song et al. | |
| 2017/0270711 A1 | 9/2017 | Schoenberg | |
| 2017/0293364 A1 * | 10/2017 | Wang | G06V 40/113 |
| 2017/0295446 A1 | 10/2017 | Shivappa | |
| 2017/0323488 A1 | 11/2017 | Mott et al. | |
| 2017/0352184 A1 | 12/2017 | Poulos et al. | |
| 2017/0357334 A1 | 12/2017 | Balan et al. | |
| 2018/0005443 A1 | 1/2018 | Poulos et al. | |
| 2018/0024641 A1 * | 1/2018 | Mao | A63F 13/428 |
| | | | 382/103 |
| 2018/0039852 A1 | 2/2018 | Nakamura et al. | |
| 2018/0075659 A1 | 3/2018 | Browy et al. | |
| 2018/0196503 A1 | 7/2018 | Ikeda et al. | |
| 2018/0259775 A1 | 9/2018 | Ono et al. | |
| 2018/0329209 A1 * | 11/2018 | Nattukallingal | G02B 27/01 |
| 2019/0025595 A1 | 1/2019 | Fukuda et al. | |

(56) References Cited

U.S. PATENT DOCUMENTS

| | | |
|---|---|---|
| 2019/0025931 A1 | 1/2019 | Anderson et al. |
| 2019/0102927 A1 | 4/2019 | Yokokawa |
| 2019/0122085 A1 | 4/2019 | Tout et al. |
| 2019/0139320 A1 | 5/2019 | Davies et al. |
| 2019/0146598 A1 | 5/2019 | Peri |
| 2019/0155394 A1 | 5/2019 | Bedikian et al. |
| 2019/0167352 A1 | 6/2019 | Mahfouz |
| 2019/0220098 A1 | 7/2019 | Gupta |
| 2019/0251696 A1 | 8/2019 | Wang et al. |
| 2019/0299059 A1 | 10/2019 | Case, Jr. et al. |
| 2019/0318544 A1 | 10/2019 | Skidmore et al. |
| 2019/0324553 A1* | 10/2019 | Liu ................ G06F 16/951 |
| 2019/0325651 A1 | 10/2019 | Bradner et al. |
| 2019/0361521 A1 | 11/2019 | Stellmach et al. |
| 2019/0362562 A1 | 11/2019 | Benson |
| 2019/0377416 A1 | 12/2019 | Alexander |
| 2019/0385371 A1 | 12/2019 | Joyce et al. |
| 2020/0005026 A1 | 1/2020 | Andersen et al. |
| 2020/0064924 A1 | 2/2020 | Poupyrev et al. |
| 2020/0097065 A1 | 3/2020 | Iyer et al. |
| 2020/0151900 A1 | 5/2020 | Weising et al. |
| 2020/0218423 A1 | 7/2020 | Ohashi |
| 2020/0311396 A1* | 10/2020 | Pollefeys ................ G06T 19/20 |
| 2020/0312029 A1 | 10/2020 | Heinen et al. |
| 2020/0387228 A1 | 12/2020 | Ravasz et al. |
| 2021/0019036 A1 | 1/2021 | Wang et al. |
| 2021/0026455 A1 | 1/2021 | Dash et al. |
| 2021/0041702 A1 | 2/2021 | Kimura et al. |
| 2021/0090337 A1 | 3/2021 | Ravasz et al. |
| 2021/0096726 A1 | 4/2021 | Faulkner et al. |
| 2021/0174519 A1 | 6/2021 | Bazarevsky et al. |
| 2021/0181938 A1 | 6/2021 | Hassan et al. |
| 2021/0183158 A1 | 6/2021 | Korngold et al. |
| 2021/0208698 A1 | 7/2021 | Martin et al. |
| 2021/0209153 A1 | 7/2021 | Zhang |
| 2021/0263593 A1 | 8/2021 | Lacey |
| 2021/0275914 A1 | 9/2021 | Wu et al. |
| 2021/0286502 A1 | 9/2021 | Lemay et al. |
| 2021/0334524 A1 | 10/2021 | Guo et al. |
| 2021/0373650 A1 | 12/2021 | Kang et al. |
| 2021/0397266 A1 | 12/2021 | Gupta et al. |
| 2022/0088476 A1 | 3/2022 | Canberk et al. |
| 2022/0103748 A1 | 3/2022 | Canberk |
| 2022/0139056 A1 | 5/2022 | Fieldman |
| 2022/0171479 A1 | 6/2022 | Chappaz et al. |
| 2022/0179495 A1 | 6/2022 | Agrawal et al. |
| 2022/0206102 A1 | 6/2022 | Brown |
| 2022/0206588 A1 | 6/2022 | Canberk et al. |
| 2022/0326781 A1 | 10/2022 | Hwang et al. |
| 2022/0334649 A1 | 10/2022 | Hwang et al. |
| 2023/0082789 A1 | 3/2023 | Lu et al. |
| 2023/0117197 A1 | 4/2023 | Stolzenberg |
| 2023/0274511 A1 | 8/2023 | Miller et al. |

FOREIGN PATENT DOCUMENTS

| | | |
|---|---|---|
| EP | 3699736 A1 | 8/2020 |
| WO | 2015192117 A1 | 12/2015 |

OTHER PUBLICATIONS

Cirulis Arnis: "Large Scale Augmented Reality for Collaborative Environments", Jul. 10, 2020 (Jul. 10, 2020), Computer Vision—ECCV 2020 : 16th European Conference, Glasgow, UK, Aug. 23-28, 2020 Proceedings; [Lecture Notes in Computer Science ; ISSN 0302-9743], Springer International Publishing, Cham, pp. 325-335, XP047554326, ISBN: 978-3-030-58594-5.

International Search Report and Written Opinion for International Application No. PCT/US2021/063295, dated Mar. 17, 2022 (Mar. 17, 2022)—13 pages.

Cas and Chary VR: https://www.youtube.com/watch?_8VqQfrHG94 , viewed on Dec. 4, 2021, published online on Feb. 25, 2020 (Year: 2020).

Engadget: "Google Glass Gesture Recognition by OnTheGo Platforms at CES 2014 : Engadget", Jan. 8, 2014 (Jan. 8, 2014), XP055859805, Retrieved from the Internet: URL:https://www.youtube.com/watch?v=d_jl_ZxPECg [retrieved on Nov. 11, 2021] 00:39s, 00:55s, 01:00-01:10s.

International Search Report and Written Opinion for International Application No. PCT/US2021/033642, dated Aug. 30, 2021 (Aug. 30, 2021)—11 pages.

International Search Report and Written Opinion for International Application No. PCT/US2021/051109, dated Dec. 10, 2021 (Dec. 10, 2021)—17 pages.

Matthias Schwaller et al: "Pointing in the Air: Measuring the Effect of Hand Selection Strategies on Performance and Effort", Jul. 1, 2013 (Jul. 1, 2013), Human Factors in Computing and Informatics, Springer Berlin Heidelberg, Berlin, Heidelberg, pp. 732-747, XP047033542, ISBN: 978-3-642-39061-6, p. 740; figure 4.

Partial International Search Report and Written Opinion for International Application No. PCT/US2021/047637, dated Jan. 7, 2022 (Jul. 1, 2022)—10 pages.

Chatain, Julia et al., "DigiGlo: Exploring the Palm as an Input and Display Mechanism through Digital Gloves," Association for Computing Machinery, CHI Play '20, Nov. 2-4, 2020, Virtual Event, Canada, 12 pages.

International Search Report and Written Opinion for International Application No. PCT/US2022/023608, dated Jul. 11, 2022 (Nov. 7, 2022)—12 pages.

International Search Report and Written Opinion for International Application No. PCT/US2022/024565, dated Jul. 25, 2022 (Jul. 25, 2022)—15 pages.

U.S. Appl. No. 17/589,065, filed Jan. 31, 2022 to Stolzenberg.

U.S. Appl. No. 17/714,352, filed Apr. 6, 2022 to Hwang et al.

U.S. Appl. No. 17/719,654, filed Apr. 13, 2022 to Hwang et al.

Google Atap: "Welcome to Project Soli", published May 29, 2015, XP055903745, Retrieved from the Internet: URL: https://www.youtube.com/watch?v=OQNiZf SsPc0&t=61s [retrieved on Mar. 21, 2022].

International Search Report and Written Opinion for International Application No. PCT/US2021/063340, dated Apr. 4, 2022 (Apr. 5, 2022)—10 pages.

Song, Chen, "Sensor Fusion for Learning-based Tracking of Controller Movement in Virtual Reality". Sep. 2019, EEE, pp. 1-5. (Year: 2019).

U.S. Appl. No. 16/865,995, filed May 4, 2020 to Canberk, et al.

U.S. Appl. No. 17/588,934, filed Jan. 31, 2022 to Stolzenberg, et al.

1st European Office Action for European Application No. 21773937.4 dated May 2, 2024, 6 pages.

* cited by examiner

810

820

US 12,086,324 B2

MICRO HAND GESTURES FOR CONTROLLING VIRTUAL AND GRAPHICAL ELEMENTS

CROSS-REFERENCE TO RELATED APPLICATIONS

This application claims priority to U.S. Provisional Application Ser. No. 63/131,403 filed on Dec. 29, 2020, the contents of which are incorporated fully herein by reference.

TECHNICAL FIELD

Examples set forth in the present disclosure relate to the field of display control for electronic devices, including wearable devices such as eyewear. More particularly, but not by way of limitation, the present disclosure describes the real-time tracking of hand gestures and micro-scale movements for controlling virtual objects and interactive graphical elements on a display.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems, and displays. Graphical user interfaces allow the user to interact with displayed content, including virtual objects and graphical elements such as icons, taskbars, list boxes, menus, buttons, and selection control elements like cursors, pointers, handles, and sliders.

Virtual reality (VR) technology generates a complete virtual environment including realistic images, sometimes presented on a VR headset or other head-mounted display. VR experiences allow a user to move through the virtual environment and interact with virtual objects. Augmented reality (AR) is a type of VR technology that combines real objects in a physical environment with virtual objects and displays the combination to a user. The combined display gives the impression that the virtual objects are authentically present in the environment, especially when the virtual objects appear and behave like the real objects.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
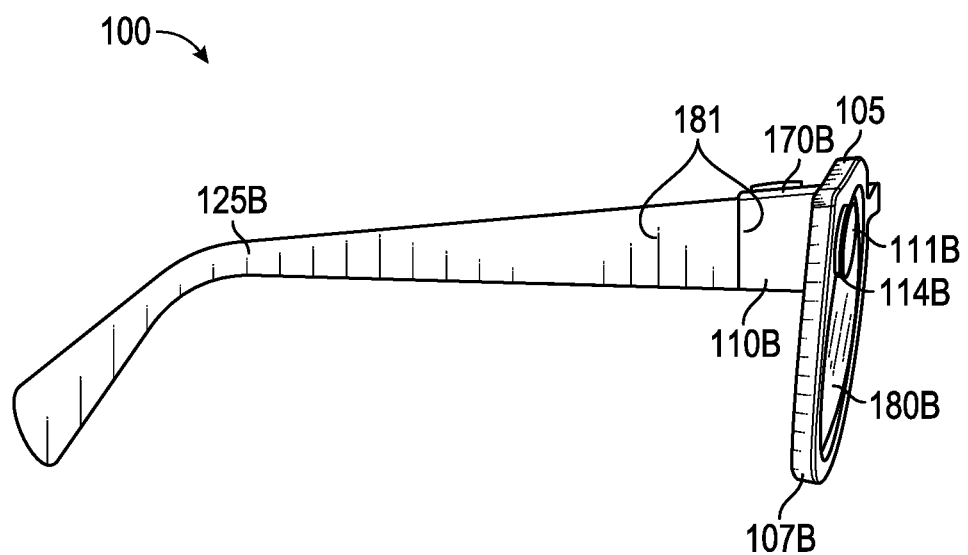
FIG. 1A is a side view (right) of an example hardware configuration of an eyewear device suitable for use in a virtual element control system.

Various implementations and details are described with reference to examples, including a method of controlling a virtual element in response to hand gestures detected by an eyewear device. The eyewear device includes a camera system, an image processing system, and a display. The method includes capturing frames of video data with the camera system, detecting a series of hand shapes in the captured frames of video data with the image processing system, determining whether the detected series of hand shapes matches a predefined series of hand gestures associated with an action, and controlling movement of the virtual element relative to the display in accordance with the associated action. Through detection of a series of hand shapes, very small or micro-scale changes in aspects of the hand (e.g., thumb position relative to a finger) can produce corresponding small or micro-scale movements of virtual objects and interactive graphical elements on a display.

In some example implementations, the virtual element includes one or more interactive graphical elements, and the detected series of hand shapes includes a thumb near an extended finger. The method, in this example, includes establishing a finger scale relative to the extended finger, wherein the finger scale extends lengthwise along the extended finger from a palmar end through a midpoint to a tip end. The method also includes calibrating a graphical scale associated with an interactive graphical element with the finger scale, identifying a current thumb position relative to the finger scale, and controlling movement of the interactive graphical element on the display according to the identified current thumb position relative to the calibrated graphical scale.

Although the various systems and methods are described herein with reference to capturing sill images with an eyewear device, the technology described may be applied to selecting and capturing still images from a sequence of frames of video data that were captured by other devices.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Advanced AR technologies, such as computer vision and object tracking, may be used to produce a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. Hand and finger recognition and tracking in real time is one of the most challenging and processing-intensive tasks in the field of computer vision.

The term "pose" refers to the static position and orientation of an object at a particular instant in time. The term "gesture" refers to the active movement of an object, such as a hand, through a series of poses, sometimes to convey a signal or idea. The terms, pose and gesture, are sometimes used interchangeably in the field of computer vision and augmented reality. As used herein, the terms "pose" or "gesture" (or variations thereof) are intended to be inclusive of both poses and gestures; in other words, the use of one term does not exclude the other.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
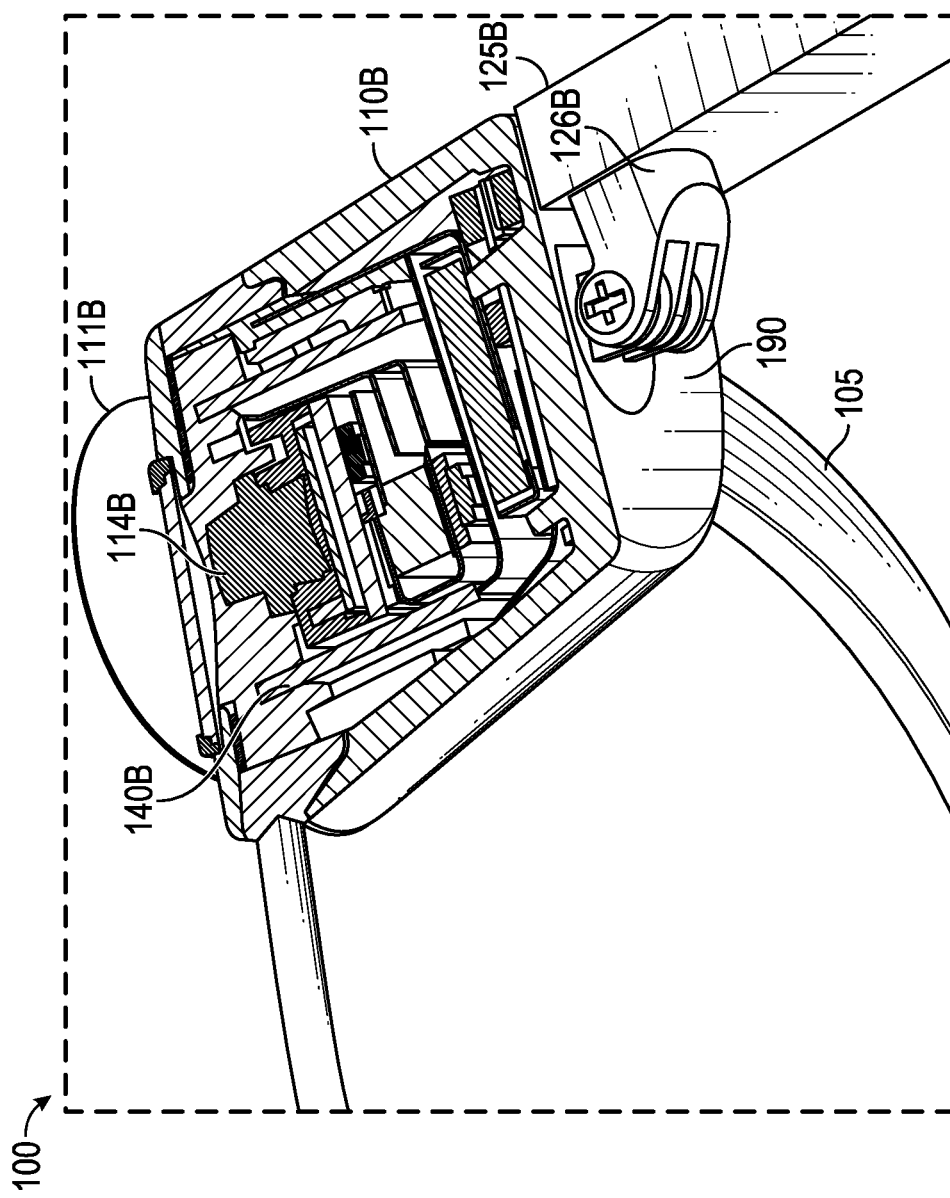
FIG. 1B is a perspective, partly sectional view of a right corner of the eyewear device of FIG. 1A depicting a right visible-light camera, and a circuit board.
Figure 1C:
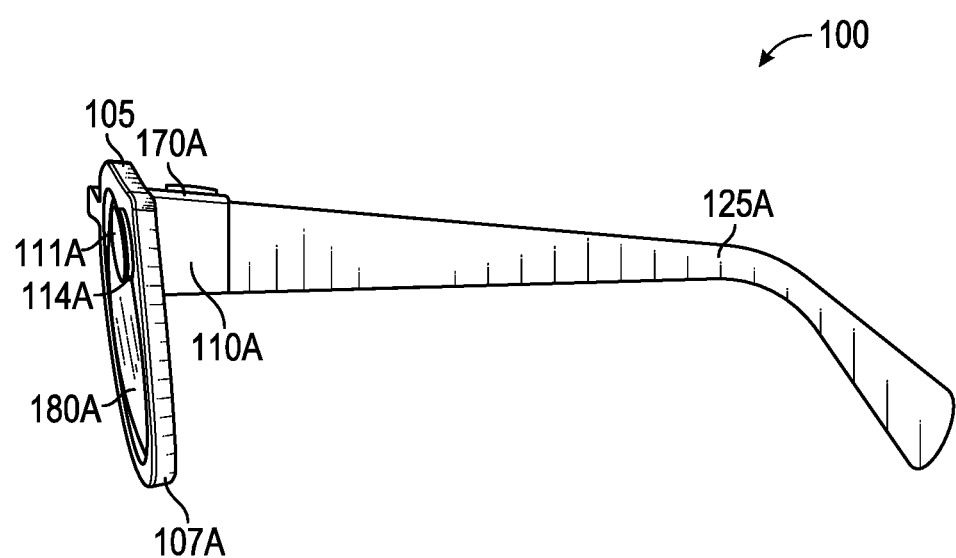
FIG. 1C is a side view (left) of an example hardware configuration of the eyewear device of FIG. 1A, which shows a left visible-light camera.
Figure 1D:
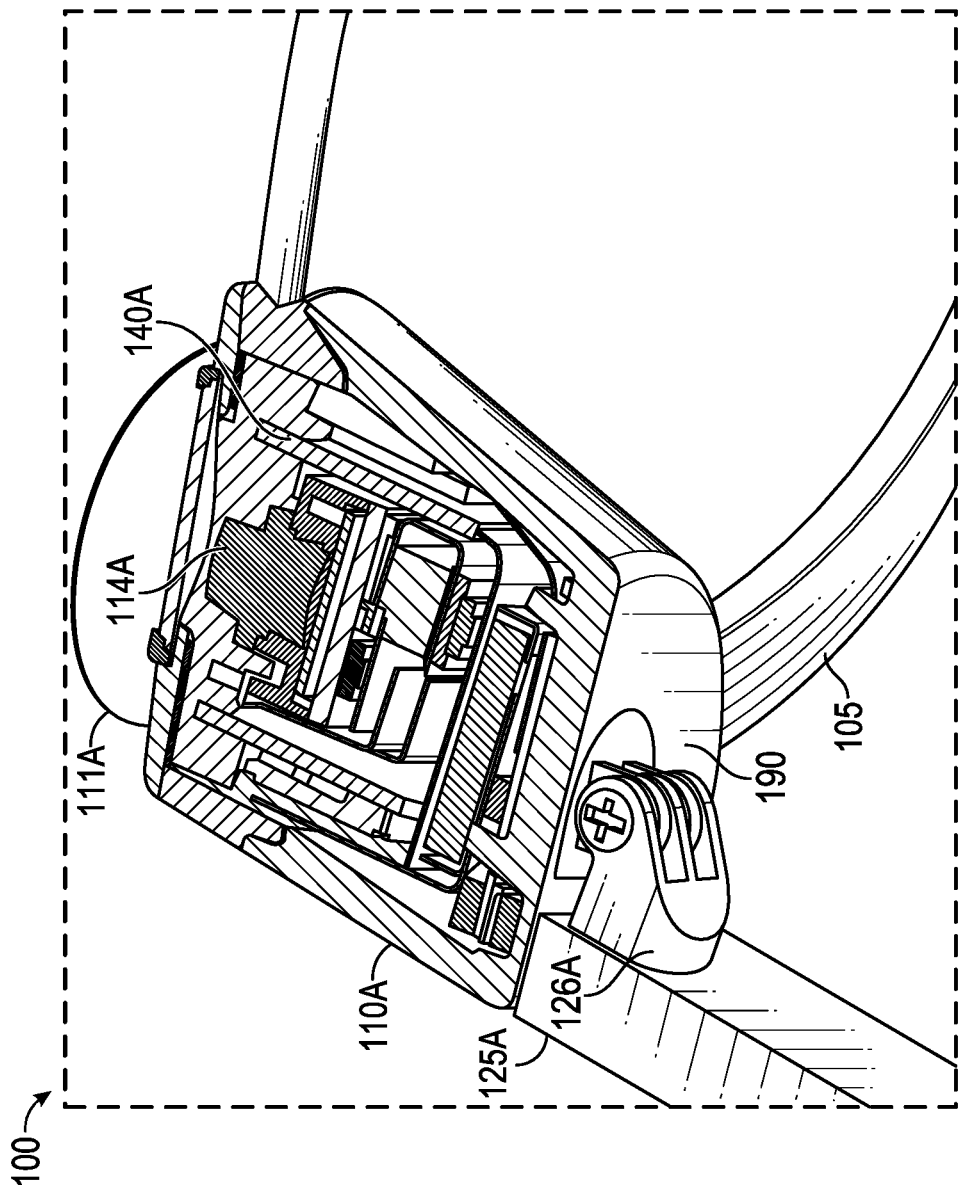
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
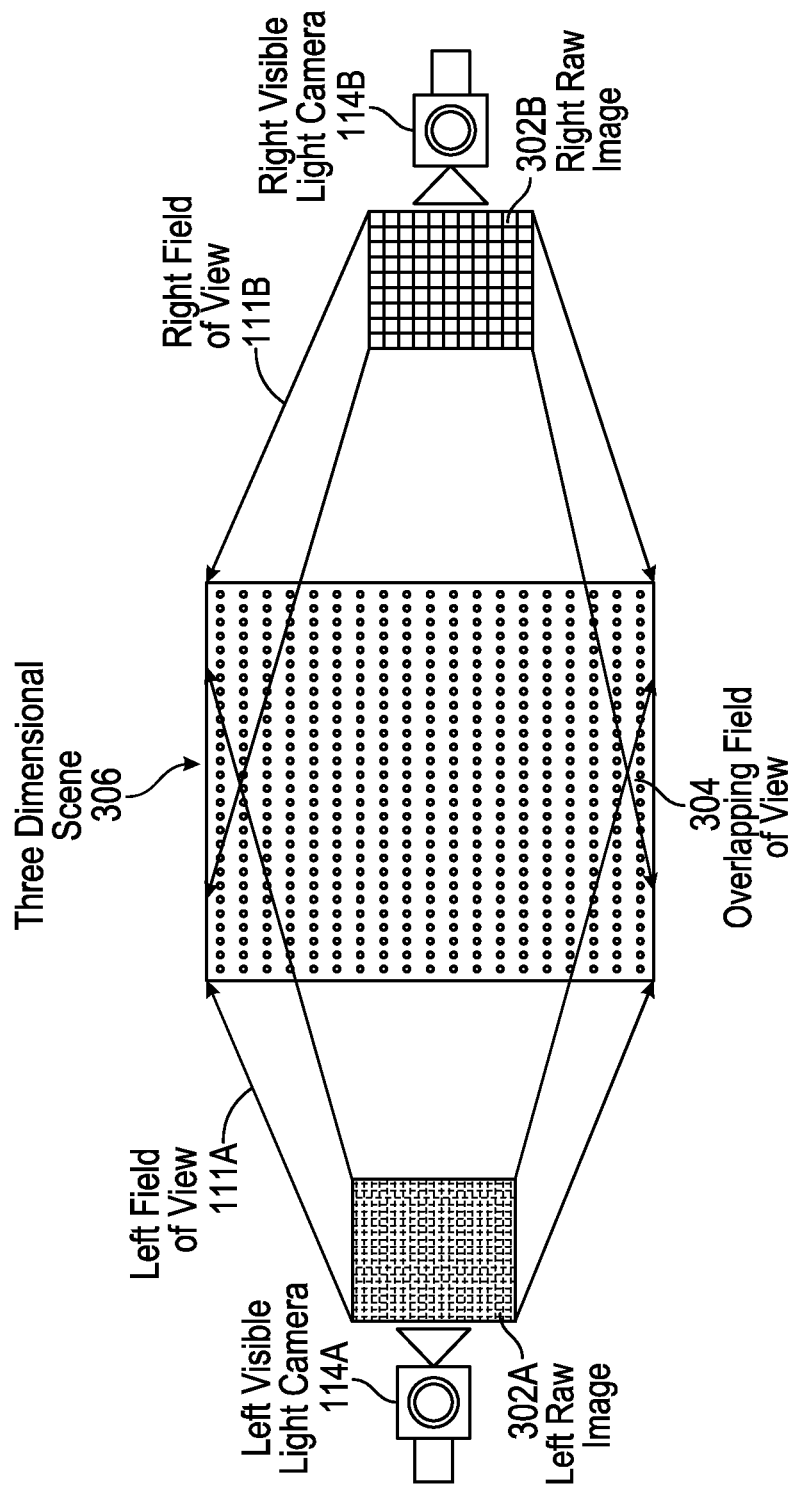
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 480p (e.g., 640×480 pixels), 720p, 1080p, or greater. Other examples include visible-light cameras 114A, 114B that can capture high-definition (HD) video at a high frame rate (e.g., thirty to sixty frames per second, or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). A right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B. A left hinge 126B connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
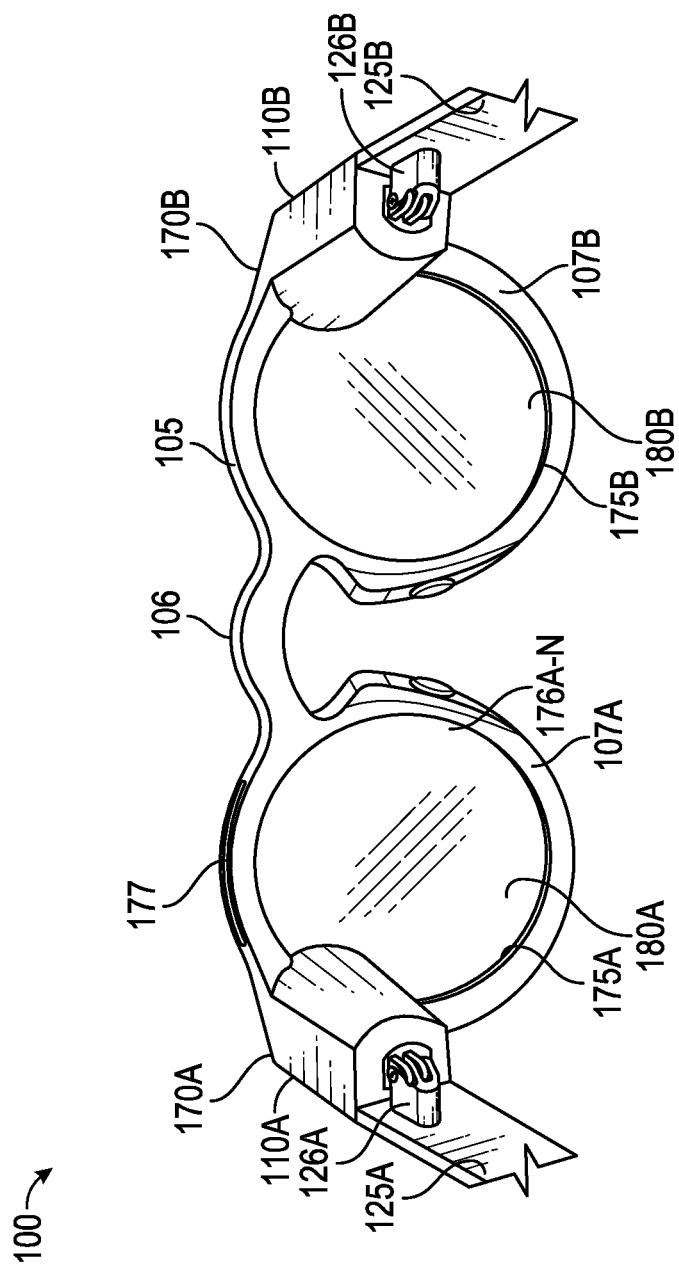
FIGS. 2A and 2B are rear views of example hardware configurations of an eyewear device utilized in the virtual element control system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
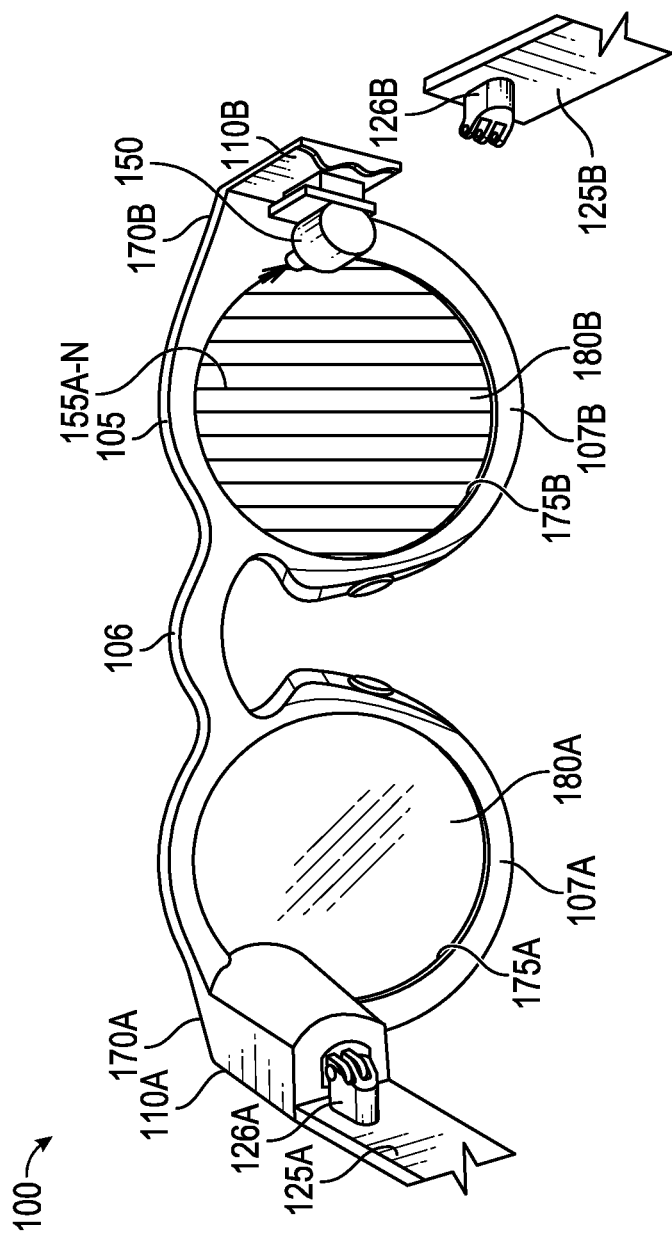

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge or diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double prime, A through N, not shown) which are configured to interact with light from the right projector 150B. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the virtual element control system 400 (FIG. 4) includes the eyewear device 100, which includes a frame 105 and a left temple 125A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 125A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
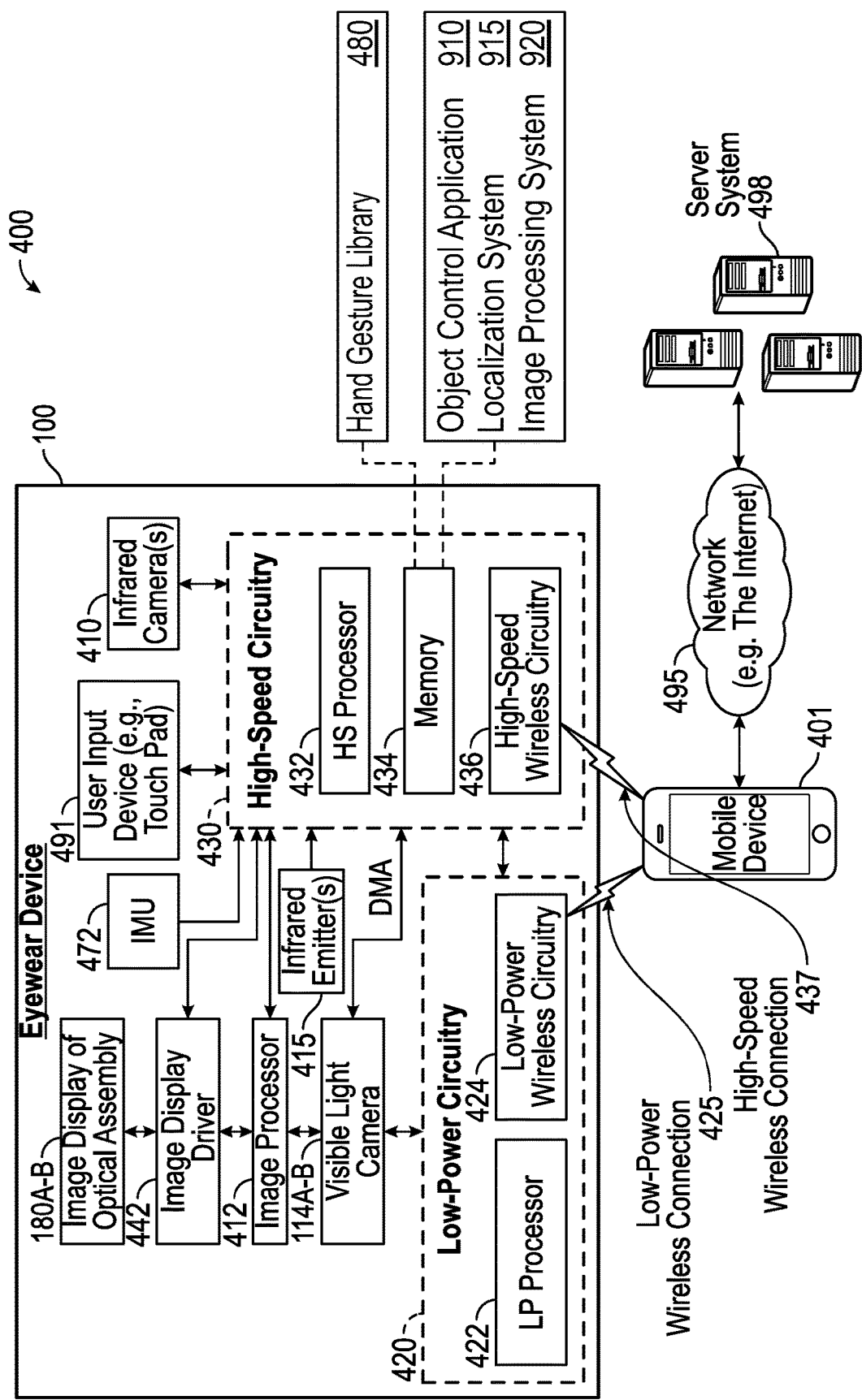
FIG. 4 is a functional block diagram of an example virtual element control system including a wearable device (e.g., an eyewear device) and a server system connected via various networks.

FIG. 4 is a functional block diagram of an example virtual element control system 400 that includes a wearable device (e.g., an eyewear device 100), a mobile device 401, and a server system 498 connected via various networks 495 such as the Internet. As shown, the virtual element control system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more speakers 440 (e.g., one associated with the left side of the eyewear device and another associated with the right side of the eyewear device). The speakers 440 may be incorporated into the frame 105, temples 125, or corners 110 of the eyewear device 100. The one or more speakers 440 are driven by audio processor 443 under control of low-power circuitry 420, high-speed circuitry 430, or both. The speakers 440 are for presenting audio signals including, for example, a beat track. The audio processor 443 is coupled to the speakers 440 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
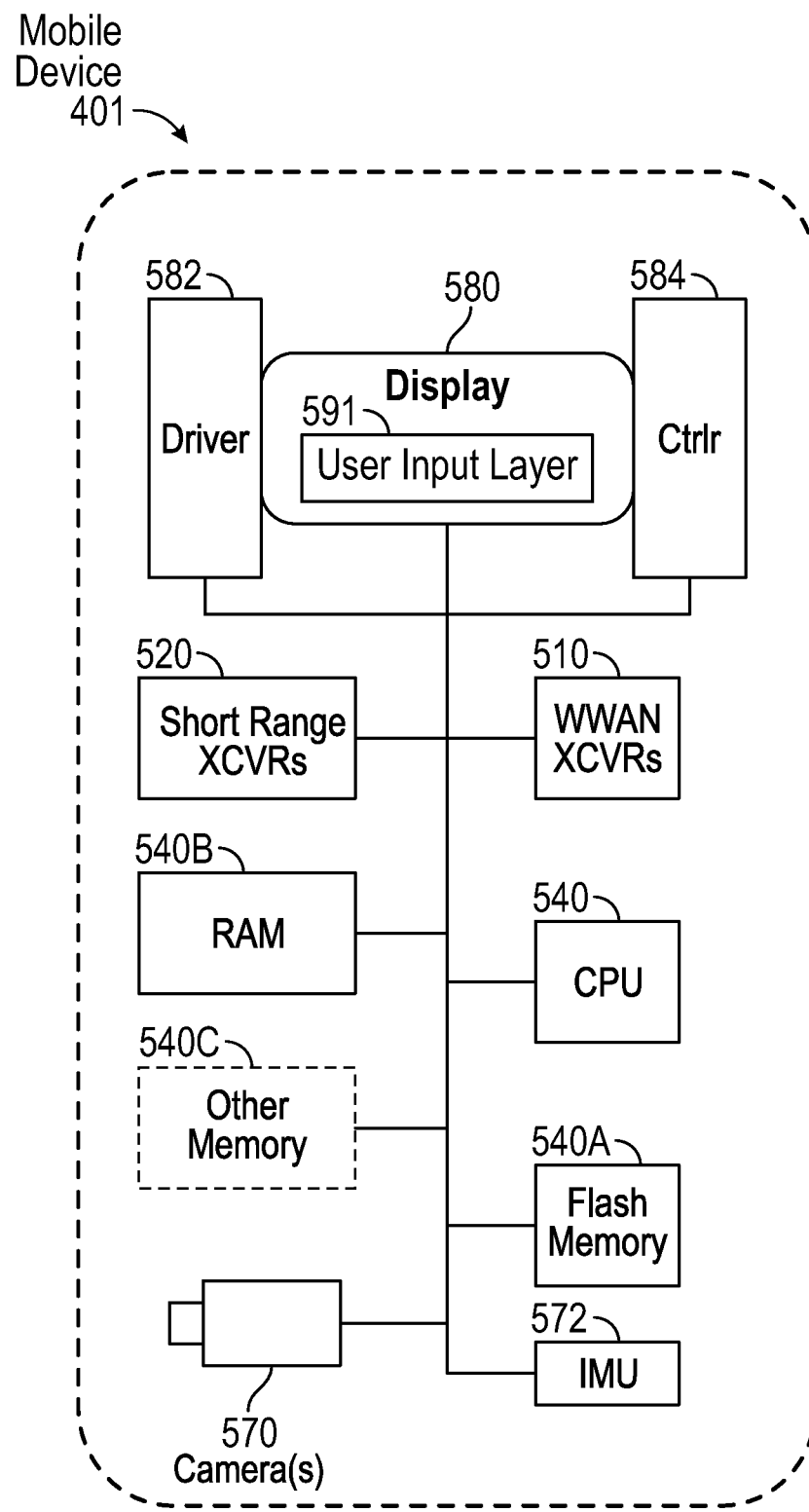
FIG. 5 is a diagrammatic representation of an example hardware configuration for a mobile device of the virtual element control system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The virtual element control system 400, as shown in FIG. 4, includes a computing device, such as mobile device 401, coupled to an eyewear device 100 over a network. The virtual element control system 400 includes a memory for storing instructions and a processor for executing the instructions. Execution of the instructions of the virtual element control system 400 by the processor 432 configures the eyewear device 100 to cooperate with the mobile device 401. The virtual element control system 400 may utilize the memory 434 of the eyewear device 100 or the memory elements 540A, 540B, 540C of the mobile device 401 (FIG. 5). Also, the virtual element control system 400 may utilize the processor elements 432, 422 of the eyewear device 100 or the central processing unit (CPU) 530 of the mobile device 401 (FIG. 5). In addition, the virtual element control system 400 may further utilize the memory and processor elements of the server system 498. In this aspect, the memory and processing functions of the virtual element control system 400 can be shared or distributed across the processors and memories of the eyewear device 100, the mobile device 401, and the server system 498.

The memory 434, in some example implementations, includes or is coupled to a hand gesture library 480. The library of hand gestures 480 includes a large number of poses and gestures, with the hand in various positions and orientations. The stored poses and gestures are suitable for ready comparison to a hand shape that is detected in an image. The library 480 includes three-dimensional coordinates for a large number of landmarks, from the wrist to the fingertips. For example, a hand gesture record stored in the library 480 may include a hand gesture identifier (e.g., pointing finger, thumb and finger making an L-shape, closed fist, open palm, relaxed hand, grasping an object, pinching, spreading), a point of view or a directional reference (e.g., palmar side visible, dorsal, lateral), and other information about orientation, along with three-dimensional coordinates for the wrist, the fifteen interphalangeal joints, the five fingertips and other skeletal or soft-tissue landmarks. The process of detecting a hand shape, in some implementations, involves comparing the pixel-level data in one or more captured frames of video data to the hand gestures stored in the library 480 until a good match is found.

The memory 434 additionally includes, in some example implementations, an object control application 910, a localization system 915, and an image processing system 920. In a virtual element control system 400 in which a camera is capturing frames of video data 900, the object control application 910 configures the processor 432 to control the movement of a virtual element 700 on a display in response to detecting one or more hand shapes or gestures. The localization system 915 configures the processor 432 to obtain localization data for use in determining the position of the eyewear device 100 relative to the physical environment. The localization data may be derived from a series of images, an IMU unit 472, a GPS unit 473, or a combination thereof. The image processing system 920 configures the processor 432 to present a captured still image on a display of an optical assembly 180A, 180B in cooperation with the image display driver 442 and the image processor 412.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 891 for receiving input (by touch, multi-touch, or gesture, and the like, by hand, stylus, or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The client device 401 in some examples includes a collection of motion-sensing components referred to as an inertial measurement unit (IMU) 572 for sensing the position, orientation, and motion of the client device 401. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the client device 401 (including the acceleration due to gravity) relative to three orthogonal axes (x, y, z). The gyroscope senses the angular velocity of the client device 401 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the client device 401 relative to magnetic north.

The IMU 572 may include or cooperate with a digital motion processor or programming that gathers the raw data from the components and compute a number of useful values about the position, orientation, and motion of the client device 401. For example, the acceleration data gathered from the accelerometer can be integrated to obtain the velocity relative to each axis (x, y, z); and integrated again to obtain the position of the client device 401 (in linear coordinates, x, y, and z). The angular velocity data from the gyroscope can be integrated to obtain the position of the client device 401 (in spherical coordinates). The programming for computing these useful values may be stored in on or more memory elements 540A, 540B, 540C and executed by the CPU 540 of the client device 401.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. Sensor data includes images received from one or both of the cameras 114A, 114B, distance(s) received from a laser range finder, position information received from a GPS unit 473, motion and acceleration data received from an IMU 572, or a combination of data from such sensors, or from other sensors that provide data useful in determining positional information. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate; in other words, calculating and updating the mapping and localization thirty times per second.

Sensor data includes image(s) received from one or both cameras 114A, 114B, distance(s) received from a laser range finder, position information received from a GPS unit 473, motion and acceleration data received from an IMU 472, or a combination of data from such sensors, or from other sensors that provide data useful in determining positional information.

Figure 6:
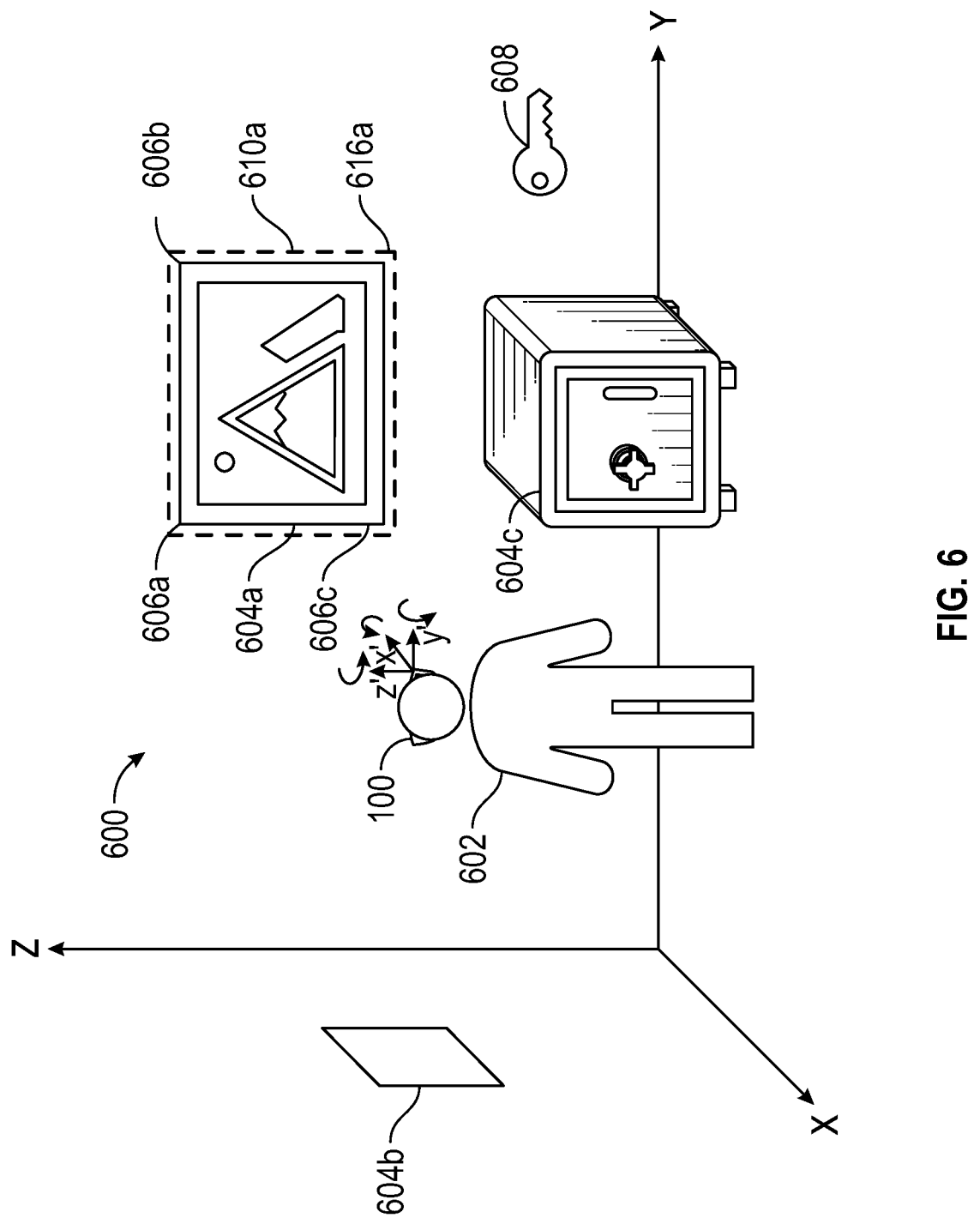
FIG. 6 is a schematic illustration of a user in an example environment for use in describing simultaneous localization and mapping.

FIG. 6 depicts an example physical environment 600 along with elements that are useful when using a SLAM application and other types of tracking applications (e.g., natural feature tracking (NFT)). A user 602 of eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606a, 606b, and 606c) associated with a single object 604a, or by using one or more location points 606 associated with two or more objects 604a, 604b, 604c. The processor 432 of the eyewear device 100 may position a virtual object 608 (such as the key shown in FIG. 6) within the environment 600 for viewing during an augmented reality experience.

The localization system 915 in some examples a virtual marker 610a associated with a virtual object 608 in the environment 600. In augmented reality, markers are registered at locations in the environment to assist devices with the task of tracking and updating the location of users, devices, and objects (virtual and physical) in a mapped environment. Markers are sometimes registered to a high-contrast physical object, such as the relatively dark object, such as the framed picture 604a, mounted on a lighter-colored wall, to assist cameras and other sensors with the task of detecting the marker. The markers may be preassigned or may be assigned by the eyewear device 100 upon entering the environment.

Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610a, the marker's position (location and orientation), one or more virtual objects, or a combination thereof. The marker position may include three-dimensional coordinates for one or more marker landmarks 616a, such as the corner of the generally rectangular marker 610a shown in FIG. 6. The marker location may be expressed relative to real-world geographic coordinates, a system of marker coordinates, a position of the eyewear device 100, or other coordinate system. The one or more virtual objects associated with the marker 610a may include any of a variety of material, including still images, video, audio, tactile feedback, executable applications, interactive user interfaces and experiences, and combinations or sequences of such material. Any type of content capable of being stored in a memory and retrieved when the marker 610a is encountered or associated with an assigned marker may be classified as a virtual object in this context. The key 608 shown in FIG. 6, for example, is a virtual object displayed as a still image, either 2D or 3D, at a marker location.

In one example, the marker 610a may be registered in memory as being located near and associated with a physical object 604a (e.g., the framed work of art shown in FIG. 6). In another example, the marker may be registered in memory as being a particular position with respect to the eyewear device 100.

Figure 13:
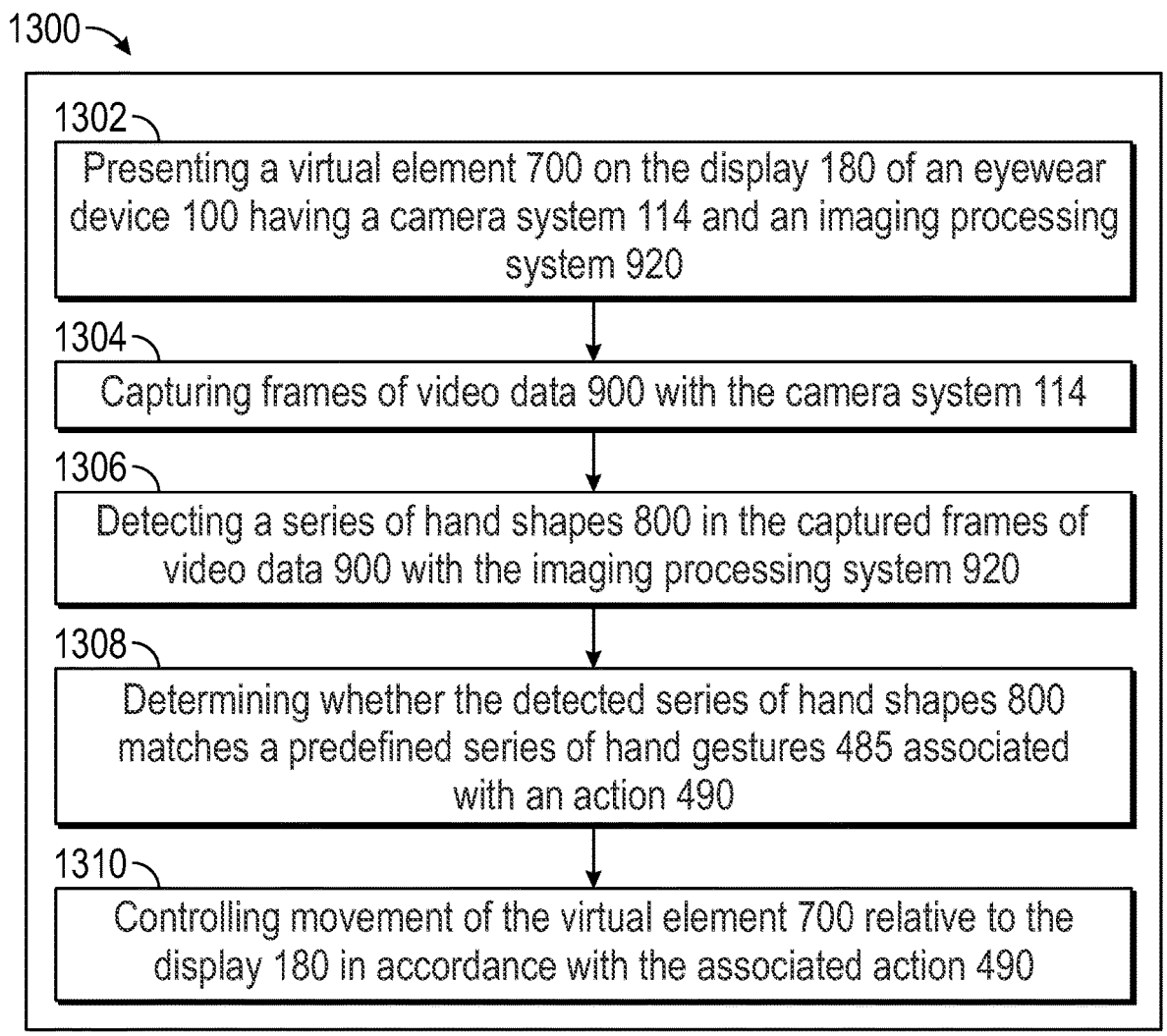
FIG. 13 is a flow chart listing the steps in an example method of controlling virtual objects and graphical elements in in response to hand gestures.

FIG. 13 is a flow chart 1300 depicting an example method of controlling a virtual element 700 presented on the display 180 of an eyewear device 100. Although the steps are described with reference to the eyewear device 100 described herein, other implementations of the steps described, for other types of devices, will be understood by one of skill in the art from the description herein. One or more of the steps shown and described may be performed simultaneously, in a series, in an order other than shown and described, or in conjunction with additional steps. Some steps may be omitted or, in some applications, repeated.

At block 1302, a virtual element 700 presented on the display 180 of an eyewear device 100. The eyewear device 100 includes an image processing system 920 and a camera system 114 that includes one or more cameras 114A, 114B for capturing still images or video. The processor 432 presents the virtual element 700 to the user on one or both image displays 180A, 180B using the image processor 412 and the image display driver 442.

Figure 7:
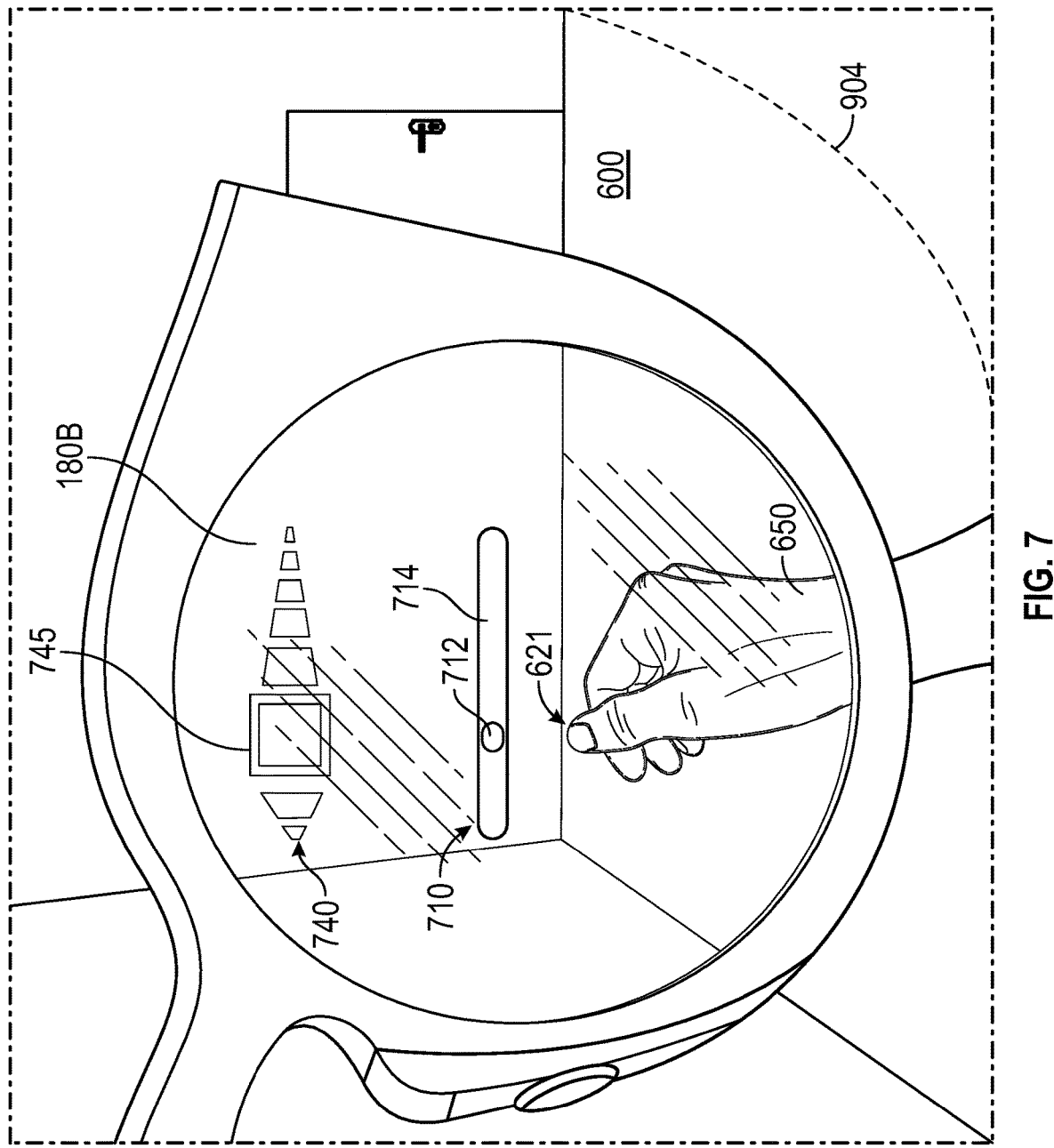
FIG. 7 is a perspective illustration of an example hand gesture controlling interactive virtual and graphical elements on a display.

As used herein, virtual element 700 means and includes any graphical element presented on a display, including but not limited to virtual objects associated with VR experiences, graphical elements such as icons, thumbnails, taskbars, and menu items, and selection control elements such as cursors, pointers, buttons, handles, and sliders; any of which may or may not be associated with a graphical user interface (GUI). The virtual element 700 may include an interactive graphical element 710 and one or more secondary graphical elements 740, as shown in FIG. 7. The virtual element 700 may include a virtual object or graphical icon, such as the game piece 755 shown in FIG. 8.

FIG. 7 is a perspective illustration of an example hand gesture controlling interactive virtual and graphical elements on an example display 180B. In this example, the eyewear device includes a semi-transparent image display 180B which, as described herein, may include a semi-transparent lens layer and a display matrix layer configured to present images on the lens of the eyewear device. The virtual element 700 is presented as an overlay relative the physical environment 600. The effect, as shown, allows the viewer to see and interact with the virtual element 700 while the surrounding environment 600 also remains visible through the display 180B. In this example, the virtual element 700 appears at a persistent location on the display 180B, as opposed to being anchored to the physical environment 600.

The virtual element 700 in this example includes an interactive graphical element 710 and one or more secondary graphical elements 740 presented on the display 180B. The interactive graphical element 710 includes a slider 712 in a viewport 714. The secondary graphical elements 740 include a plurality of menu items, presented in various sizes. An element correlated with the slider 712 includes a menu item highlight 745, which may be presented around or near a proposed or candidate selection, and when a final selection is made.

The secondary graphical elements 740 may be presented in size and shape to correspond to the interactive graphic element 710, as shown. Alternatively, the secondary graphical elements 740 may be presented elsewhere and in a different size and shape, as long as the arrangement of the secondary graphical elements 740 is correlated with the location of the slider 712.

The location of the slider 712 is correlated with the current thumb position 621 relative to the hand 650, as shown, according to the methods described herein. The hand 650 and hand shapes are detected and differentiated from other elements in the physical environment 600 as viewed through the semi-transparent display 180B and captured by the camera system 114. The physical environment 600, of course, may be much more complex than the simple room shown. The camera system 114 typically has a camera field of view 904 that captures images and video beyond the limits of the display 180B. In this aspect, the image processing system 920 detects hand shapes which may be located outside the view through the display 180B, but within the camera field of view 904.

Figure 8:
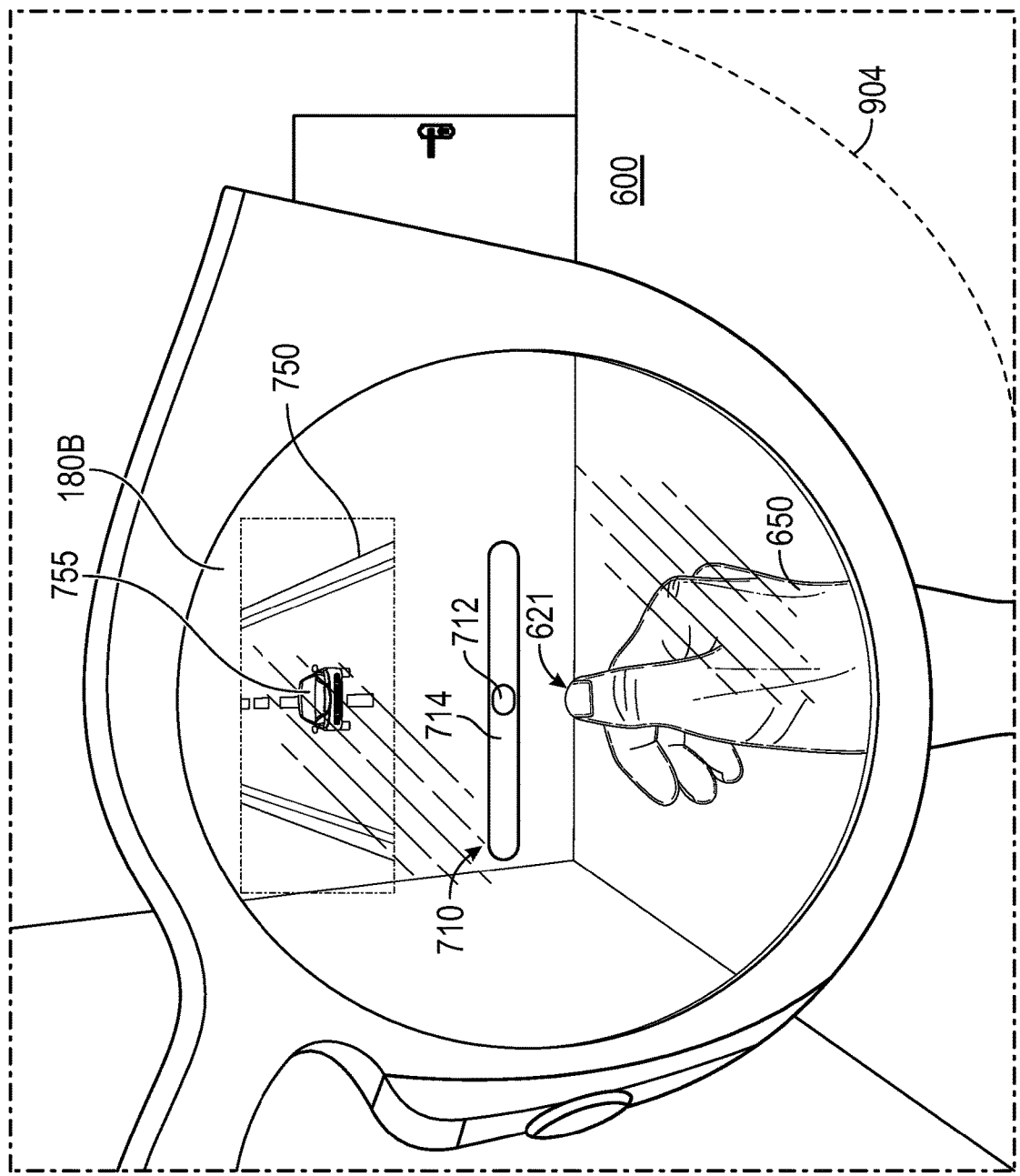
FIG. 8 is a perspective illustration of another example hand gesture controlling interactive virtual and graphical elements on a display.

FIG. 8 is a perspective illustration of another example hand gesture controlling interactive virtual and graphical elements on a display. The virtual element 700 in this example includes a game piece 755 presented on a field of play 750. In this example, the current thumb position 621 is connected to the game piece 755, such that the game piece 755 moves in real time as the thumb position moves. The example shown in FIG. 8 may (or may not) include an interactive graphical element 710 together with the game piece 755 on the field of play 750.

Block 1304 describes an example step of capturing frames a video data 900 with the camera system 114. In some implementations, the high-speed processor 432 of the eyewear device 100 stores the captured frames of video data 900 with a camera system 114 as the wearer moves through a physical environment 600. As described above, the camera system 114 typically has a camera field of view 904 that captures images and video beyond the limits of the display 180B.

The camera system 114, in some implementations, includes one or more high-resolution, digital cameras equipped with a CMOS image sensor capable of capturing high-definition still images and high-definition video at relatively high frame rates (e.g., thirty frames per second or more). Each frame of digital video includes depth information for a plurality of pixels in the image. In this aspect, the camera system 114 serves as a high-definition scanner by capturing a detailed input image of the physical environment. The camera system 114, in some implementations, includes a pair of high-resolution digital cameras 114A, 114B coupled to the eyewear device 100 and spaced apart to acquire a left-camera raw image and a right-camera raw image, as described herein. When combined, the raw images form an input image that includes a matrix of three-dimensional pixel locations. The example method, at block 1304, in some implementations, includes storing the captured frames of video data 900 in memory 434 on the eyewear device 100, at least temporarily, such that the frames are available for analysis.

Block 1306 describes an example step of detecting a series of hand shapes 800 in the captured frames of video data 900 with the image processing system 920. In some example implementations, an image processing system 412 analyzes the pixel-level data in the captured frames of video data 900 to determine if the frame includes a human hand and, if so, whether the frame includes a particular hand shape. The data in the frame is compared to a large number of hand poses and gestures stored in a library of hand gestures 480.

Figure 9:
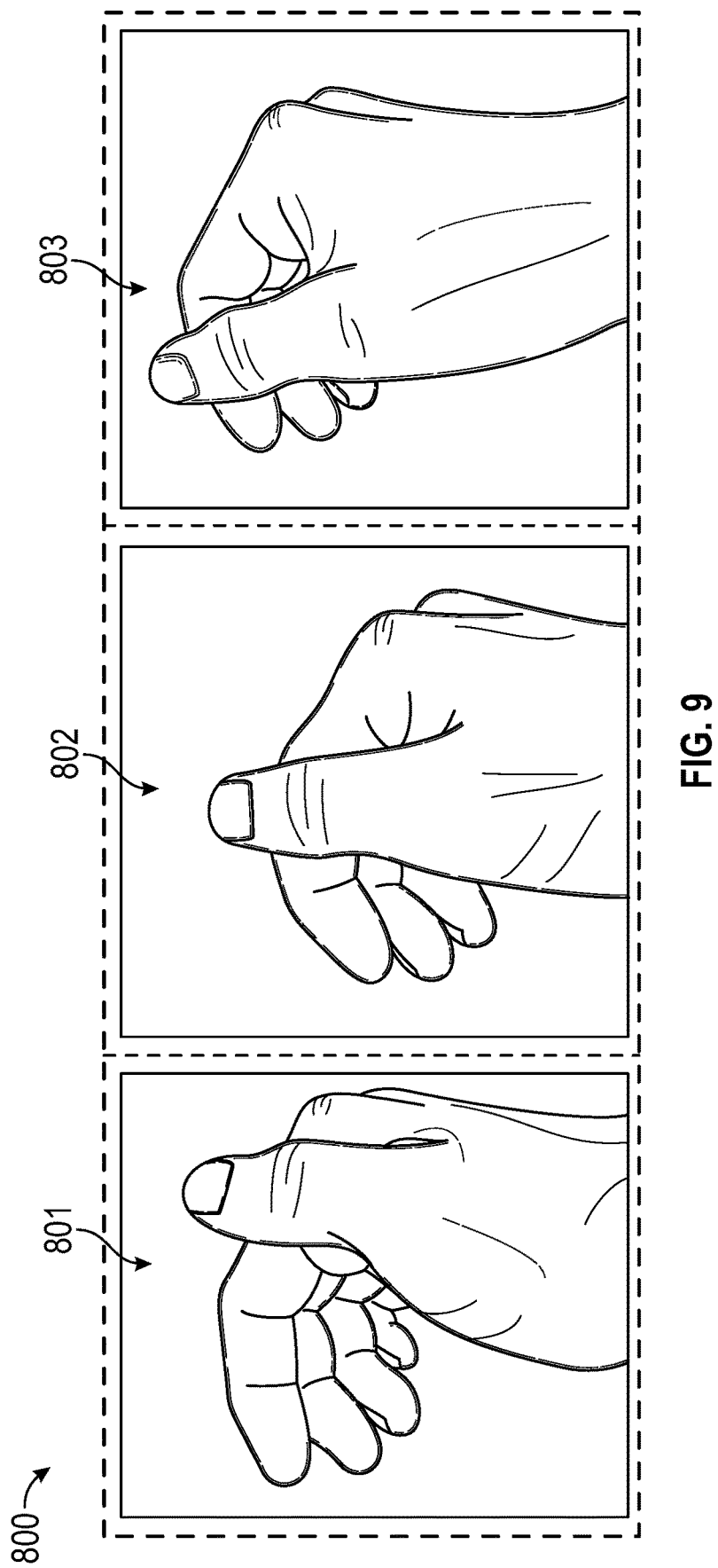
FIG. 9 is a perspective illustration of an example series of hand gestures.

An example series of hand shapes 800 is shown in FIG. 9, including a first hand shape 801 in which the thumb is located near the palmar end of the extended index finger, a second hand shape 802 in which the thumb is located near the midpoint, and a third hand shape 803 in which the thumb is located near the tip of the finger. The process of detecting a series of hand shapes 800 in some implementations includes analyzing a sequential subset of the captured frames of video data 900 to determine if a hand shape appears persistently in sequential frames. For example, a first hand shape 801 might appear in one or several frames, temporarily, but then disappear before appearing in a threshold number of sequential frames of video data 900.

Block 1308 describes an example step of determining whether the detected series of hand shapes 800 matches a predefined series of hand gestures 485. This determining step may be accomplished by the image processing system 920 or the object control application 910. The predefined series of hand gestures 485 and their associated actions 490 may be stored in the hand gesture library 480 in a database or a set of relational databases.

The detected series of hand shapes 800 captured in the video data 900 are compared to a plurality of sets of predefined series of hand gestures 485 stored in the hand gesture library 480 to identify a match. As used herein, the term match is meant to include substantial matches or near matches, which may be governed by a predetermined confidence value associated with possible or candidate matches. The detected hand shape data may include three-dimensional coordinates for the wrist, up to fifteen interphalangeal joints, up five fingertips, and other skeletal or soft-tissue landmarks found in a captured frame. In some examples, the detecting process includes calculating the sum of the geodesic distances between the detected hand shape fingertip coordinates and a set of fingertip coordinates for each hand gesture stored in the library 480. A sum that falls within a configurable threshold accuracy value represents a match.

In another example implementation, the process of determining whether a detected hand shape matches a shutter gesture, involves using a machine-learning algorithm to compare the pixel-level data about the hand shape in one or more captured frames of video data to a collection of images that include hand gestures.

Machine learning refers to an algorithm that improves incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

In the context of computer vision, mathematical models attempt to emulate the tasks accomplished by the human visual system, with the goal of using computers to extract information from an image and achieve an accurate understanding of the contents of the image. Computer vision algorithms have been developed for a variety of fields, including artificial intelligence and autonomous navigation, to extract and analyze data in digital images and video.

Deep learning refers to a class of machine-learning methods that are based on or modeled after artificial neural networks. An artificial neural network is a computing system made up of a number of simple, highly interconnected processing elements (nodes), which process information by their dynamic state response to external inputs. A large artificial neural network might have hundreds or thousands of nodes.

A convolutional neural network (CNN) is a type of neural network that is frequently applied to analyzing visual images, including digital photographs and video. The connectivity pattern between nodes in a CNN is typically modeled after the organization of the human visual cortex, which includes individual neurons arranged to respond to overlapping regions in a visual field. A neural network that is suitable for use in the determining process described herein is based on one of the following architectures: VGG16, VGG19, ResNet50, Inception V3, Xception, or other CNN-compatible architectures.

In the machine-learning example, at block 1308, the processor 432 determines whether a detected hand shape substantially matches a shutter gesture using a machine-trained algorithm referred to as a hand feature model. The processor 432 is configured to access the hand feature model, trained through machine learning, and applies the hand feature model to identify and locate features of the hand shape in one or more frames of the video data.

In one example implementation, the trained hand feature model receives a frame of video data which contains a detected hand shape and abstracts the image in the frame into layers for analysis. Data in each layer is compared to hand gesture data stored in the hand gesture library 480, layer by layer, based on the trained hand feature model, until a good match is identified.

In one example, the layer-by-layer image analysis is executed using a convolutional neural network. In a first convolution layer, the CNN identifies learned features (e.g., hand landmarks, sets of joint coordinates, and the like). In a second convolution layer, the image is transformed into a plurality of images, in which the learned features are each accentuated in a respective sub-image. In a pooling layer, the sizes and resolution of the images and sub-images are reduced in order isolation portions of each image that include a possible feature of interest (e.g., a possible palm shape, a possible finger joint). The values and comparisons of images from the non-output layers are used to classify the image in the frame. Classification, as used herein, refers to the process of using a trained model to classify an image according to the detected hand shape. For example, an image may be classified as "shutter gesture present" if the detected hand shape matches the shutter gesture from the library 480.

Figure 10:
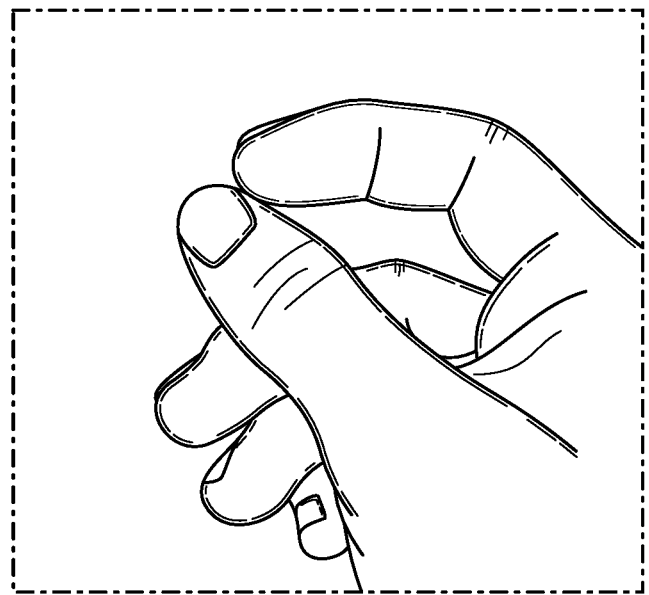
FIG. 10 is a perspective illustration of an example selecting hand gesture.
Figure 11:
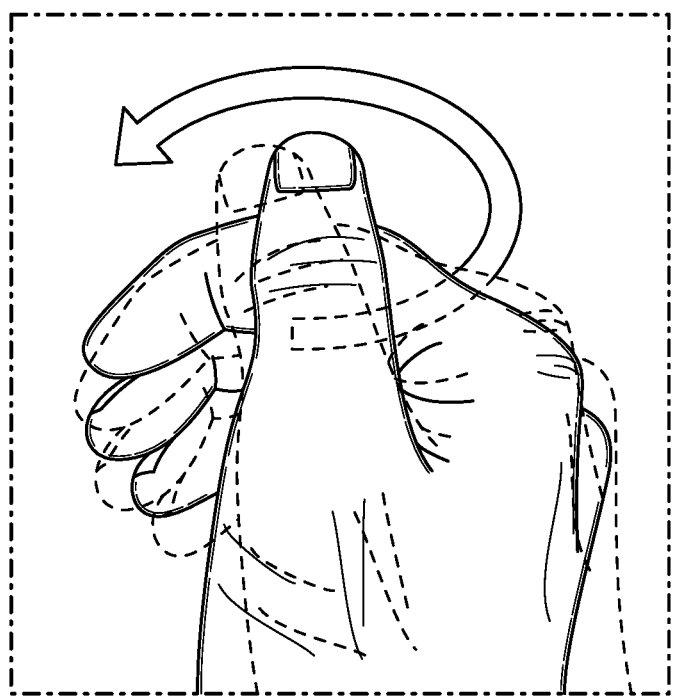
FIG. 11 is a perspective illustration of an example navigating hand gesture.

Each predefined series of hand gestures 485 is associated with an action 490. For example, a predefined selecting gesture 810 (e.g., tapping the thumb against a finger, as shown in FIG. 10) is associated with a selecting action, such as selecting an item from a menu and presenting an item highlight 745 near the selected item. A predefined navigating gesture 820 (e.g., rotating the hand about the wrist, shown in FIG. 11) is associated with a navigating action, such as presenting a next menu or other graphical element on the display.

The predefined selecting gesture 810 in some example implementations includes tapping the thumb against a side of an extended finger (or another finger), tapping the thumb near the tip end of the extended finger (or another finger), flexing the thumb, contracting all or part of the hand in a grasping motion, lingering the thumb at a generally stationary location relative to the display (or relative to the finger scale, as described herein), and removing all or most of the hand from the camera field of view 904. Any of a variety of other predefined selecting gestures may be established and stored in the hand gesture library 480.

The predefined navigating gesture 820 in some example implementations includes rotating a hand in excess of a predetermined angle of rotation relative to the wrist, swiping the thumb, the extended finger, or another finger in excess of a predetermined lateral distance, and contracting the hand in a grasping motion. Any of a variety of other predefined navigating gestures may be established and stored in the hand gesture library 480. For example, the process of detecting a rotating hand, in some implementations, includes identifying an initial rotational direction (e.g., clockwise or counterclockwise) before the hand at least partially reverses its rotation and returns to its initial position. The virtual elements 700 may be associated with a display order. In response to a clockwise initial rotational direction, the next or subsequent graphical element is presented on the display. In response to a counterclockwise initial rotational direction, the last or previous graphical element is presented on the display.

Block 1310 describes an example step of controlling the movement of the virtual element 700 in accordance with the associated action 490. Movement in this context includes presenting the virtual element 700 at a generally continual series of locations on the display 180, in accordance with a sequence of associated actions, so that the virtual element 700 appears to move in real time as the detected hand shapes change. For example, in FIG. 7, the captured hand shape (e.g., thumb sliding along the index finger) substantially matches a series of hand gestures that is associated with the action of movement left and right. In response, the virtual element 700 (e.g., the slider 712) moves left and right, in accordance with the associated left-right action.

In FIG. 8 the virtual element 700 includes a game piece 755 presented on a field of play 750. In this example, the current thumb position 621 is connected to the game piece 755, such that the game piece 755 moves in real time as the thumb position moves. The process of controlling the movement in this example includes determining whether the current thumb position 621 is near the game piece 755 (e.g., whether the thumb is detected within a predefined area on the display relative to the game piece 755) and then controlling the movement of the game piece 755 with the movement of the current thumb position 621.

Figure 12:
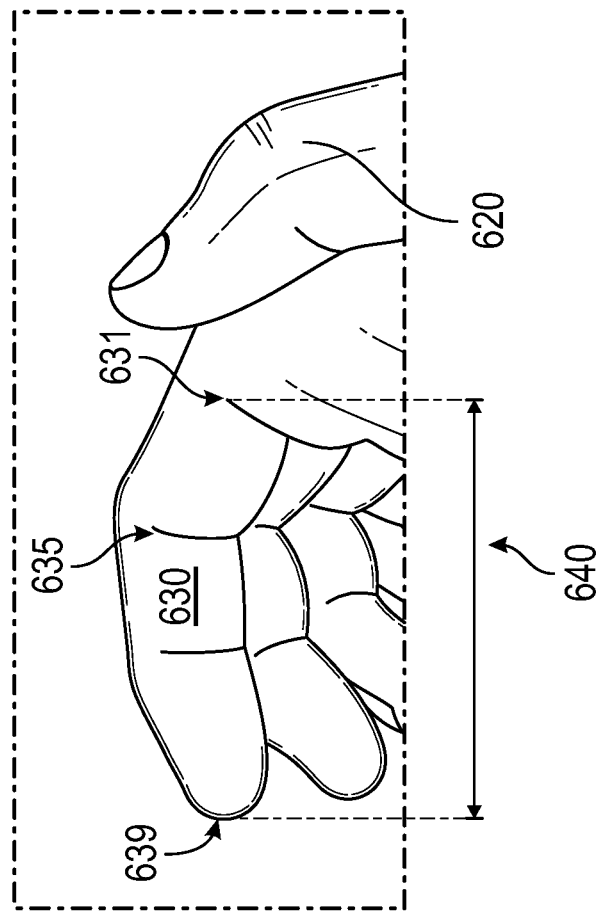
FIG. 12 is a schematic illustration of an example calibration of a graphical scale with a finger scale.
Figure 12:
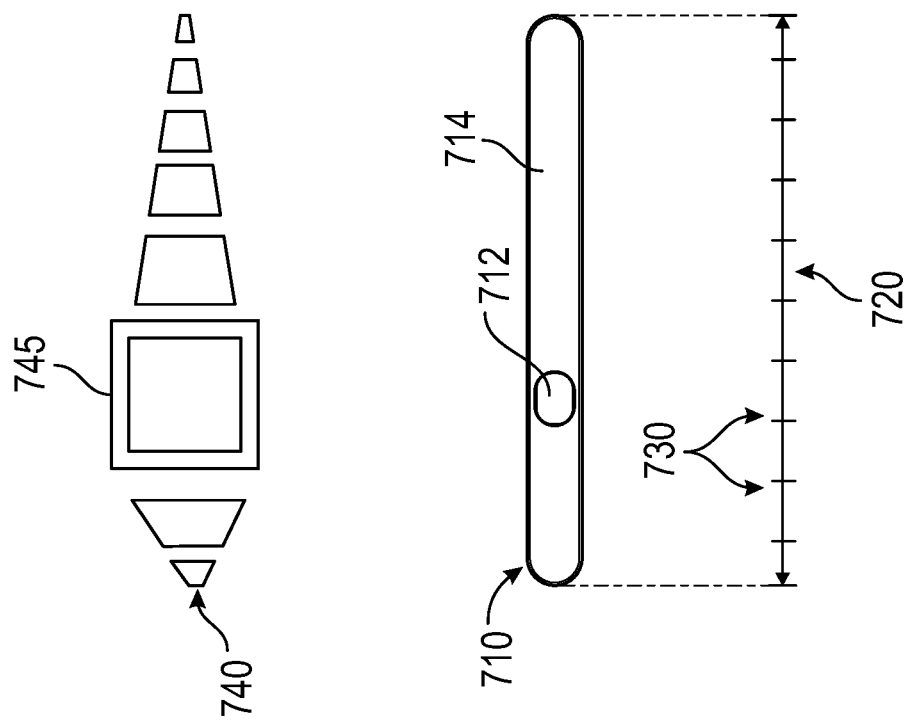

FIG. 12 is a schematic illustration of an example calibration of a graphical scale with a finger scale. In this example, the virtual element 700 includes an interactive graphical element 710, such as a slider 712 in a viewport 714. The detected hand shape includes a thumb 620 near an extended finger 630. The extended finger 630 may be the first or index finger, as shown, or any other finger.

Calibrating the slider 712 with the finger 630, in this example, includes establishing a finger scale 640 relative to the size and orientation of the extended finger 630, as identified by the camera. The finger scale 640 extends lengthwise along the extended finger 630 from a palmar end 631 (near where the finger meets the palm of the hand), through a midpoint 635 (which may be near the middle joint) to a tip end 693 of the finger. The interactive graphical element 710 is characterized by a graphical scale 720 that corresponds to the length or other dimension associated with the element 710 (e.g., the length of the slider viewport 714). In other examples, the graphical scale 720 is a dimension associated with one or more secondary graphical elements

740, such as the total length of a set or subset of secondary graphical elements 740 (without reference to a slider 712 or similar element).

The graphical scale 720, as shown, may include one or more incremental locations 730 along its length. The incremental locations 730 may be numerous, which facilitates a highly sensitive response to the current thumb position 621 relative to the finger scale 640. In this aspect, very small or micro-scale changes in the current thumb position 621 will result in corresponding small or micro-scale movements of virtual objects and interactive graphical elements on a display.

The process of calibrating the graphical scale 720 to the finger scale 640 includes comparing the scales 720, 640 and mathematically correlating the length of the graphical scale 720 to the length of the finger scale 640.

In this example, the process of detecting hand shapes at block 1306 further includes identifying, in the frames of video data 900, a current thumb position 621 relative to the finger scale 640. The process of controlling movement of the virtual element at block 1310 includes controlling movement of the interactive graphical element 710 (e.g., the slider 712) in accordance with the identified current thumb position 621 relative to the calibrated graphical scale 720, such that the slider moves 712 when as the thumb position 621 moves. As shown in FIG. 12, movement of the slider 712 in this example includes presenting one or more secondary graphical elements 740 which appear to move in real time in coordination with movement of the slider 712.

For example, when the extended finger 630 is associated with a right hand, as shown in FIG. 12, the slider 712 is presented at its current incremental location when, and for as long as, the identified current thumb position 621 is near the midpoint 635 of the finger scale 640. The slider 712 is presented at a next right-most incremental location when the identified current thumb position 621 is between the midpoint 635 and the palmar end 631 of the finger scale 640. Conversely, the slider 712 is presented at a next left-most incremental location when the identified current thumb position 621 is between the midpoint 635 and the tip end 639 of the finger scale 640.

In a related aspect, the apparent speed of the motion of the slider 712 may be controlled in proportion to a distance of a gap (gap distance) between the identified current thumb position 621 and the midpoint 635 of the finger scale 640. The greater the gap distance away from the midpoint 635, the faster the slider 712 appears to move on the display, relative to its previous location.

In another example, as shown in FIG. 8, the greater the gap distance away from the midpoint 635, the faster the game piece 755 appears to move on the display, relative to its previous location on the field of play 750.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of controlling virtual elements in response to hand gestures detected with an eyewear device, the eyewear device comprising a camera system, an image processing system, and a display, the method comprising:
   capturing frames of video data within a field of view associated with the camera system;
   detecting a series of hand shapes in the captured frames of video data with the image processing system, wherein the detected series of hand shapes includes a thumb near an extended finger;
   determining whether the detected series of hand shapes matches a predefined series of hand gestures associated with an action;
   establishing a finger scale relative to the extended finger, the finger scale extending lengthwise from a palmar end through a midpoint to a tip end;
   calibrating a graphical scale relative to the display with the finger scale, wherein graphical scale is associated with both a virtual element and an interactive graphical element;
   identifying, in the frames of video data with the image processing system, a current thumb position relative to the finger scale;
   measuring a gap distance between the identified current thumb position and the midpoint of the finger scale;
   presenting the interactive graphical element on the display at a series of locations in accordance with the identified current thumb position, the calibrated graphical scale, and the gap distance, such that the interactive graphical element appears to move through the series of locations at a speed correlated with the gap distance; and
   controlling movement of the virtual element relative to the display in accordance with the associated action and according to the identified current thumb position relative to the calibrated graphical scale.

2. The method of claim 1, further comprising:
   determining whether the detected series of hand shapes matches a second predefined series of hand gestures associated with a second action; and
   controlling the movement of the virtual element relative to the display in accordance with the associated second action.

3. The method of claim 1, wherein the virtual element comprises a plurality of virtual elements presented on the display, the method further comprising:
   identifying, in the frames of video data with the image processing system, a current thumb position relative to the display; and
   presenting an item highlight near one of the plurality of virtual elements on the display according to the identified current thumb position.

4. The method of claim 1, wherein the step of controlling movement of the virtual element comprises:
   identifying, in the frames of video data with the image processing system, a current thumb position relative to the virtual element; and
   in response to determining whether the identified thumb position is within a predefined area on the display relative to the virtual element, presenting the virtual element at a series of locations on the display in accordance with the identified current thumb position, such that the virtual element appears to move in near real time as the current thumb position moves.

5. The method of claim 1, further comprising:
   determining whether the detected series of hand shapes matches a selecting hand gesture associated with a selecting action, wherein the selecting hand gesture comprises a selecting motion selected from the group consisting of:
   tapping the thumb against a side of the extended finger or another finger, tapping the thumb near the tip end of the extended finger or another finger, flexing the thumb, contracting a hand in a grasping motion, lingering the thumb at a generally stationary location relative to the display, and removing the hand from the camera system field of view; and
   presenting on the display a selected element in accordance with the associated selecting action.

6. The method of claim 1, wherein the virtual element comprises a plurality of virtual elements, each associated with a secondary graphical element presented in a display order, the method further comprising:
   determining whether the detected series of hand shapes matches a navigating hand gesture associated with a navigating action, wherein the navigating hand gesture comprises a navigating motion selected from the group consisting of:
   rotating a hand in excess of a predetermined angle of rotation relative to a wrist, swiping the thumb, the extended finger, or another finger in excess of a predetermined lateral distance, and contracting the hand in a grasping motion; and
   presenting on the display a selected secondary graphical element, in the display order, in accordance with the associated navigating action.

7. The method of claim 6, wherein the step of presenting a selected secondary graphical element comprises:
   identifying an initial rotational direction associated with the navigating hand gesture;
   presenting a previous secondary graphical element in the display order in response to a counterclockwise initial rotational direction; and
   presenting a subsequent secondary graphical element in the display order in response to a clockwise initial rotational direction.

8. The method of claim 1, wherein the calibrated graphical scale comprises a plurality of incremental locations, wherein the extended finger is associated with a right hand, and wherein the step of controlling movement further comprises:

presenting the interactive graphical element at a next right incremental location along the calibrated graphical scale when, and for as long as, the identified current thumb position is located between the midpoint and the palmar end of the extended finger;

presenting the interactive graphical element at a next left incremental location along the graphical scale when, and for as long as, the identified current thumb position is located between the midpoint and the tip end of the extended finger; and presenting the interactive graphical element at a current incremental location along the graphical scale when, and for as long as, the identified current thumb position is located near the midpoint.

9. The method of claim 1, wherein measuring the gap distance further comprises identifying a direction relative to the midpoint, and
wherein presenting the interactive graphical element further comprises accelerating the interactive graphical element according to the direction.

10. A virtual element control system, comprising:
an eyewear device comprising a processor, a memory, a camera system, an image processing system, and a display;
programming in the memory, wherein execution of the programming by the processor configures the eyewear device to perform functions, including functions to:
capture frames of video data within a field of view associated with the camera system;
detect a series of hand shapes in the captured frames of video data with the image processing system;
determine whether the detected series of hand shapes matches a predefined series of hand gestures associated with an action, wherein the detected series of hand shapes includes a thumb near an extended finger;
establish a finger scale relative to the extended finger, the finger scale extending lengthwise from a palmar end through a midpoint to a tip end;
calibrate a graphical scale relative to the display with the finger scale, wherein the graphical scale is associated with both a virtual element and an interactive graphical element;
identify, in the frames of video data with the image processing system, a current thumb position relative to the finger scale;
measure a gap distance between the identified current thumb position and the midpoint of the finger scale;
present the interactive graphical element on the display at a series of locations in accordance with the identified current thumb position, the calibrated graphical scale, and the gap distance, such that the interactive graphical element appears to move through the series of locations at a speed correlated he gap distance: and
control movement of the virtual element relative to the display in accordance with the associated action and according to the identified current thumb position relative to the calibrated graphical scale.

11. The system of claim 10, wherein the execution of the programming further configures the eyewear device to:
determine whether the detected series of hand shapes matches a second predefined series of hand gestures associated with a second action; and
control the movement of the virtual element relative to the display in accordance with the associated second action.

12. The system of claim 10, wherein the execution of the programming further configures the eyewear device to:

determine whether the detected series of hand shapes matches a selecting hand gesture associated with a selecting action, wherein the selecting hand gesture comprises a selecting motion selected from the group consisting of:
tapping the thumb against a side of the extended finger or another finger, tapping the thumb near the tip end of the extended finger or another finger, flexing the thumb, contracting a hand in a grasping motion, lingering the thumb at a generally stationary location relative to the display, and removing the hand from the camera system, field of view; and
present on the display a selected element in accordance with the associated selecting action.

13. The system of claim 10, wherein the virtual element comprises a plurality of virtual elements, each associated with a secondary graphical element presented in a display order, and wherein the execution of the programming further configures the eyewear device to:
determine whether the detected series of hand shapes matches a navigating hand gesture associated with a navigating action, wherein the navigating hand gesture comprises a navigating motion selected from the group consisting of:
rotating a hand in excess of a predetermined angle of rotation relative to a wrist, swiping the thumb, the extended finger, or another finger in excess of a predetermined lateral distance, and contracting the hand in a grasping motion; and
present on the display a selected secondary graphical element, in the display order, in accordance with the associated navigating action.

14. The system of claim 10, wherein the execution of the programming further configures the eyewear device to:
identify a direction associated with the gap distance relative to the midpoint of the finger scale; and
present the interactive graphical element on the display through the series of locations at an apparent acceleration according to the direction and the gap distance.

15. A non-transitory computer-readable medium storing program code which, when executed, is operative to cause an electronic processor to perform the steps of:
capturing frames of video data within a field of view associated with a camera system, wherein the camera system is coupled to an eyewear device comprising a processor, a memory, a display, and an image processing system;
detecting a series of hand shapes in the captured frames of video data with the image processing system;
determining whether the detected series of hand shapes matches a predefined series of hand gestures associated with an action, wherein the detected series of hand shapes includes a thumb near an extended finger;
establishing a finger scale relative to the extended finger, the finger scale extending lengthwise from a palmar end through a midpoint to a tip end;
calibrating a graphical scale relative to the display with the finger scale, wherein the graphical scale is associated with both a virtual element and an interactive graphical element;
identifying, in the frames of video data with the image processing system, a current thumb position relative to the finger scale;
measuring a gap distance between the identified current thumb position and the midpoint of the finger scale;
presenting the interactive graphical element on the display at a series of locations in accordance with the identified current thumb position, the calibrated graphical scale, and the gap distance, such that the interactive graphical element appears to move through the series of locations at a speed correlated with the gap distance; and controlling movement of the virtual element relative to the display in accordance with the associated action and according to the identified current thumb position relative to the calibrated graphical scale.

16. The non-transitory computer-readable medium storing program code of claim 15, wherein the program code, when executed, is operative to cause the electronic processor to perform the further steps of:

determining whether the detected series of hand shapes matches a selecting hand gesture associated with a selecting action, wherein the selecting hand gesture comprises a selecting motion selected from the group consisting of:

tapping the thumb against a side of the extended finger or another finger, tapping the thumb near the tip end of the extended finger or another finger, flexing the thumb, contracting a hand in a grasping motion, lingering the thumb at a generally stationary location relative to the display, and removing the hand from the camera system field of view; and presenting on the display a selected element in accordance with the associated selecting action.

17. The non-transitory computer-readable medium storing program code of claim 15, wherein the virtual element comprises a plurality of virtual elements, each associated with a secondary graphical element presented in a display order, and wherein the program code, when executed, is operative to cause the electronic processor to perform the further steps of:

determining whether the detected series of hand shapes matches a navigating hand gesture associated with a navigating action, wherein the navigating hand gesture comprises a navigating motion selected from the group consisting of:

rotating a hand in excess of a predetermined angle of rotation relative to a wrist, swiping the thumb, the extended finger, or another finger in excess of a predetermined lateral distance, and contracting the hand in a grasping motion; and presenting on the display a selected secondary graphical element, in the display order, in accordance with the associated navigating action.

* * * * *